US009805288B2

(12) United States Patent
Kaasila et al.

(10) Patent No.: US 9,805,288 B2
(45) Date of Patent: *Oct. 31, 2017

(54) ANALYZING FONT SIMILARITY FOR PRESENTATION

(71) Applicant: Monotype Imaging Inc., Woburn, MA (US)

(72) Inventors: Sampo Juhani Kaasila, Plaistow, NH (US); Anand Vijay, Bhopal (IN); Jitendra Kumar Bansal, Karauli (IN)

(73) Assignee: Monotype Imaging Inc., Woburn, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/053,244

(22) Filed: Feb. 25, 2016

(65) Prior Publication Data
US 2016/0171343 A1 Jun. 16, 2016

Related U.S. Application Data

(63) Continuation of application No. 14/046,609, filed on Oct. 4, 2013, now Pat. No. 9,317,777.

(51) Int. Cl.
*G06T 11/00* (2006.01)
*G06K 9/62* (2006.01)
(Continued)

(52) U.S. Cl.
CPC ......... *G06K 9/6215* (2013.01); *G06F 17/214* (2013.01); *G06F 17/2211* (2013.01);
(Continued)

(58) Field of Classification Search
CPC . G06F 17/214; G06F 17/2211; G06K 9/6215; G06K 9/6256; G06K 9/6828; G06T 11/60
See application file for complete search history.

(56) References Cited

U.S. PATENT DOCUMENTS 4,244,657 A 1/1981 Wasylyk
4,998,210 A 3/1991 Kadono
(Continued)

FOREIGN PATENT DOCUMENTS

EP 0949574 10/1999
EP 2166488 A2 3/2010
(Continued)

OTHER PUBLICATIONS

International Search Report & Written Opinion, PCT/US2016/023282, mailed Oct. 7, 2016, 16 pages.
(Continued)

*Primary Examiner* — Xiao Wu
*Assistant Examiner* — Mohammad H Akhavannik
(74) *Attorney, Agent, or Firm* — Fish & Richardson P.C.

(57) ABSTRACT

A system includes a computing device that includes a memory configured to store instructions. The system also includes a processor to execute the instructions to perform operations that include receiving data representing features of a first font and data representing features of a second font. The first font and the second font are capable of representing one or more glyphs. Operations also include receiving survey-based data representing the similarity between the first and second fonts, and, training a machine learning system using the features of the first font, the features of the second font and the survey-based data that represents the similarity between the first and second fonts.

36 Claims, 14 Drawing Sheets

(51) Int. Cl.
   *G06F 17/21*      (2006.01)
   *G06F 17/22*      (2006.01)
   *G06K 9/68*       (2006.01)
   *G06T 11/60*      (2006.01)

(52) U.S. Cl.
   CPC ......... *G06K 9/6256* (2013.01); *G06K 9/6828*
                 (2013.01); *G06T 11/60* (2013.01)

(56) References Cited

U.S. PATENT DOCUMENTS

| | | |
|---|---|---|
| 5,347,266 A | 9/1994 | Bauman et al. |
| 5,412,771 A | 5/1995 | Fenwick |
| 5,416,898 A | 5/1995 | Opstad et al. |
| 5,444,829 A | 8/1995 | Kawabata et al. |
| 5,453,938 A | 9/1995 | Gohara et al. |
| 5,526,477 A | 6/1996 | McConnell et al. |
| 5,528,742 A | 6/1996 | Moore et al. |
| 5,533,174 A | 7/1996 | Flowers et al. |
| 5,586,242 A | 12/1996 | McQueen et al. |
| 5,606,649 A | 2/1997 | Tai |
| 5,619,721 A | 4/1997 | Maruko |
| 5,630,028 A | 5/1997 | DeMeo |
| 5,737,599 A | 4/1998 | Rowe et al. |
| 5,748,975 A | 5/1998 | Van De Vanter |
| 5,757,384 A | 5/1998 | Ikeda |
| 5,761,395 A | 6/1998 | Miyazaki et al. |
| 5,781,714 A | 7/1998 | Collins et al. |
| 5,877,776 A | 3/1999 | Beaman et al. |
| 5,940,581 A | 8/1999 | Lipton |
| 5,995,718 A | 11/1999 | Hiraike |
| 6,012,071 A | 1/2000 | Krishna et al. |
| 6,016,142 A | 1/2000 | Chang |
| 6,031,549 A | 2/2000 | Hayes-Roth |
| 6,044,205 A | 3/2000 | Reed et al. |
| 6,065,008 A | 5/2000 | Simon et al. |
| 6,073,147 A | 6/2000 | Chan et al. |
| 6,111,654 A | 8/2000 | Cartier |
| 6,141,002 A | 10/2000 | Kanungo et al. |
| 6,249,908 B1 | 6/2001 | Stamm |
| 6,252,671 B1 | 6/2001 | Peng et al. |
| 6,282,327 B1 | 8/2001 | Betrisey et al. |
| 6,313,920 B1 | 11/2001 | Dresevic et al. |
| 6,320,587 B1 | 11/2001 | Funyu |
| 6,330,577 B1 | 12/2001 | Kim |
| 6,343,301 B1 | 1/2002 | Halt et al. |
| 6,426,751 B1 | 7/2002 | Patel |
| 6,490,051 B1 | 12/2002 | Nguyen et al. |
| 6,512,531 B1 | 1/2003 | Gartland |
| 6,522,330 B2 | 2/2003 | Kobayashi |
| 6,522,347 B1 | 2/2003 | Tsuji |
| 6,583,789 B1 | 6/2003 | Carlson et al. |
| 6,657,625 B1 | 12/2003 | Chik et al. |
| 6,675,358 B1 | 1/2004 | Kido |
| 6,678,688 B1 | 1/2004 | Unruh |
| 6,687,879 B1 | 2/2004 | Teshima |
| 6,704,116 B1 | 3/2004 | Abulhab |
| 6,704,648 B1 | 3/2004 | Naik et al. |
| 6,718,519 B1 | 4/2004 | Taieb |
| 6,738,526 B1 | 5/2004 | Betrisey |
| 6,754,875 B1 | 6/2004 | Paradies |
| 6,760,029 B1 | 7/2004 | Phinney et al. |
| 6,771,267 B1 | 8/2004 | Muller |
| 6,810,504 B2 | 10/2004 | Cooper et al. |
| 6,813,747 B1 | 11/2004 | Taieb |
| 6,853,980 B1 | 2/2005 | Ying et al. |
| 6,856,317 B2 | 2/2005 | Konsella et al. |
| 6,882,344 B1 | 4/2005 | Hayes et al. |
| 6,901,427 B2 | 5/2005 | Teshima |
| 6,907,444 B2 | 6/2005 | Narasimhan et al. |
| 6,952,210 B1 | 10/2005 | Renner et al. |
| 6,993,538 B2 | 1/2006 | Gray |
| 7,050,079 B1 | 5/2006 | Estrada et al. |
| 7,064,757 B1 | 6/2006 | Opstad et al. |
| 7,064,758 B2 | 6/2006 | Chik et al. |
| 7,155,672 B1 | 12/2006 | Adler et al. |
| 7,184,046 B1 | 2/2007 | Hawkins |
| 7,188,313 B2 | 3/2007 | Hughes et al. |
| 7,228,501 B2 | 6/2007 | Brown et al. |
| 7,231,602 B1 | 6/2007 | Truelove et al. |
| 7,346,845 B2 | 3/2008 | Teshima et al. |
| 7,477,988 B2 | 1/2009 | Dorum |
| 7,492,365 B2 | 2/2009 | Corbin et al. |
| 7,505,040 B2 | 3/2009 | Stamm et al. |
| 7,539,939 B1 | 5/2009 | Schomer |
| 7,552,008 B2 | 6/2009 | Newstrom et al. |
| 7,580,038 B2 | 8/2009 | Chik et al. |
| 7,583,397 B2 | 9/2009 | Smith |
| 7,636,885 B2 | 12/2009 | Merz et al. |
| 7,701,458 B2 | 4/2010 | Sahuc et al. |
| 7,752,222 B1 | 7/2010 | Cierniak |
| 7,768,513 B2 | 8/2010 | Klassen |
| 7,836,094 B2 | 11/2010 | Ornstein et al. |
| 7,882,432 B2 | 2/2011 | Nishikawa et al. |
| 7,937,658 B2 | 5/2011 | Lunde |
| 7,944,447 B2 | 5/2011 | Clegg et al. |
| 7,958,448 B2 | 6/2011 | Fattic et al. |
| 8,098,250 B2 | 1/2012 | Clegg et al. |
| 8,116,791 B2 | 2/2012 | Agiv |
| 8,201,088 B2 | 6/2012 | Levantovsky et al. |
| 8,201,093 B2 | 6/2012 | Tuli |
| 8,306,356 B1 | 11/2012 | Bever |
| 8,381,115 B2 | 2/2013 | Tranchant et al. |
| 8,413,051 B2 | 4/2013 | Bacus et al. |
| 8,464,318 B1 | 6/2013 | Hallak |
| 8,601,374 B2 | 12/2013 | Parham |
| 8,643,542 B2 | 2/2014 | Wendel |
| 8,643,652 B2 | 2/2014 | Kaplan |
| 8,644,810 B1 | 2/2014 | Boyle |
| 8,689,101 B2 | 4/2014 | Fux et al. |
| 8,731,905 B1 | 5/2014 | Tsang |
| 9,317,777 B2 | 4/2016 | Kaasila et al. |
| 9,319,444 B2 | 4/2016 | Levantovsky |
| 9,569,865 B2 | 2/2017 | Kaasila et al. |
| 9,691,169 B2 | 6/2017 | Kaasila et al. |
| 2001/0052901 A1 | 12/2001 | Kawabata et al. |
| 2002/0010725 A1 | 1/2002 | Mo |
| 2002/0033824 A1 | 3/2002 | Stamm |
| 2002/0052916 A1 | 5/2002 | Kloba et al. |
| 2002/0057853 A1 | 5/2002 | Usami |
| 2002/0087702 A1 | 7/2002 | Mori |
| 2002/0093506 A1 | 7/2002 | Hobson |
| 2002/0174186 A1 | 11/2002 | Hashimoto et al. |
| 2002/0194261 A1 | 12/2002 | Teshima |
| 2003/0014545 A1 | 1/2003 | Broussard et al. |
| 2003/0076350 A1 | 4/2003 | Vu |
| 2003/0197698 A1 | 10/2003 | Perry et al. |
| 2004/0025118 A1 | 2/2004 | Renner |
| 2004/0088657 A1 | 5/2004 | Brown et al. |
| 2004/0119714 A1 | 6/2004 | Everett et al. |
| 2004/0177056 A1 | 9/2004 | Davis et al. |
| 2004/0189643 A1 | 9/2004 | Frisken et al. |
| 2004/0207627 A1 | 10/2004 | Konsella et al. |
| 2004/0233198 A1 | 11/2004 | Kubo |
| 2005/0015307 A1 | 1/2005 | Simpson et al. |
| 2005/0033814 A1 | 2/2005 | Ota |
| 2005/0094173 A1 | 5/2005 | Engelman et al. |
| 2005/0111045 A1 | 5/2005 | Imai |
| 2005/0128508 A1 | 6/2005 | Greef et al. |
| 2005/0149942 A1 | 7/2005 | Venkatraman |
| 2005/0190186 A1 | 9/2005 | Klassen |
| 2005/0193336 A1 | 9/2005 | Fux et al. |
| 2005/0200871 A1 | 9/2005 | Miyata |
| 2005/0264570 A1 | 12/2005 | Stamm |
| 2005/0270553 A1 | 12/2005 | Kawara |
| 2005/0275656 A1 | 12/2005 | Corbin et al. |
| 2006/0010371 A1 | 1/2006 | Shur et al. |
| 2006/0017731 A1 | 1/2006 | Matskewich et al. |
| 2006/0061790 A1 | 3/2006 | Miura |
| 2006/0072136 A1 | 4/2006 | Hodder et al. |
| 2006/0072137 A1 | 4/2006 | Nishikawa et al. |
| 2006/0072162 A1 | 4/2006 | Nakamura |
| 2006/0103653 A1 | 5/2006 | Chik et al. |
| 2006/0103654 A1 | 5/2006 | Chik et al. |

(56) References Cited

U.S. PATENT DOCUMENTS

| | | |
|---|---|---|
| 2006/0168639 A1 | 7/2006 | Gan |
| 2006/0241861 A1 | 10/2006 | Takashima |
| 2006/0245727 A1 | 11/2006 | Nakano et al. |
| 2006/0267986 A1 | 11/2006 | Bae et al. |
| 2006/0269137 A1 | 11/2006 | Evans |
| 2006/0285138 A1 | 12/2006 | Merz et al. |
| 2007/0002016 A1 | 1/2007 | Cho et al. |
| 2007/0006076 A1 | 1/2007 | Cheng |
| 2007/0008309 A1 | 1/2007 | Sahuc et al. |
| 2007/0050419 A1 | 3/2007 | Weyl et al. |
| 2007/0055931 A1 | 3/2007 | Zaima |
| 2007/0139412 A1 | 6/2007 | Stamm |
| 2007/0139413 A1 | 6/2007 | Stamm et al. |
| 2007/0159646 A1 | 7/2007 | Adelberg et al. |
| 2007/0172199 A1 | 7/2007 | Kobayashi |
| 2007/0211062 A1 | 9/2007 | Engelman et al. |
| 2007/0283047 A1 | 12/2007 | Theis et al. |
| 2008/0028304 A1 | 1/2008 | Levantovsky et al. |
| 2008/0030502 A1 | 2/2008 | Chapman |
| 2008/0154911 A1 | 6/2008 | Cheng |
| 2008/0282186 A1 | 11/2008 | Basavaraju |
| 2008/0303822 A1 | 12/2008 | Taylor |
| 2008/0306916 A1 | 12/2008 | Gonzalez et al. |
| 2009/0031220 A1 | 1/2009 | Tranchant |
| 2009/0063964 A1 | 3/2009 | Huang |
| 2009/0119678 A1 | 5/2009 | Shih |
| 2009/0158134 A1 | 6/2009 | Wang |
| 2009/0183069 A1 | 7/2009 | Duggan et al. |
| 2009/0275351 A1 | 11/2009 | Jeung et al. |
| 2009/0287998 A1 | 11/2009 | Kalra |
| 2009/0303241 A1 | 12/2009 | Priyadarshi et al. |
| 2009/0307585 A1 | 12/2009 | Tranchant et al. |
| 2010/0014104 A1 | 1/2010 | Soord |
| 2010/0066763 A1 | 3/2010 | MacDougall |
| 2010/0088606 A1 | 4/2010 | Kanno |
| 2010/0088694 A1 | 4/2010 | Peng |
| 2010/0091024 A1 | 4/2010 | Myadam |
| 2010/0115454 A1 | 5/2010 | Tuli |
| 2010/0164984 A1 | 7/2010 | Rane |
| 2010/0218086 A1 | 8/2010 | Howell et al. |
| 2010/0231598 A1 | 9/2010 | Hernandez et al. |
| 2010/0275161 A1 | 10/2010 | DiCamillo |
| 2010/0321393 A1 | 12/2010 | Levantovsky |
| 2011/0029103 A1 | 2/2011 | Mann et al. |
| 2011/0090229 A1 | 4/2011 | Bacus et al. |
| 2011/0090230 A1 | 4/2011 | Bacus et al. |
| 2011/0093565 A1 | 4/2011 | Bacus et al. |
| 2011/0115797 A1 | 5/2011 | Kaplan |
| 2011/0131153 A1 | 6/2011 | Grim, III |
| 2011/0188761 A1 | 8/2011 | Boutros et al. |
| 2011/0238495 A1 | 9/2011 | Kang |
| 2011/0271180 A1 | 11/2011 | Lee |
| 2011/0276872 A1 | 11/2011 | Kataria |
| 2011/0289407 A1 | 11/2011 | Naik |
| 2011/0310432 A1 | 12/2011 | Waki |
| 2012/0001922 A1 | 1/2012 | Escher et al. |
| 2012/0016964 A1 | 1/2012 | Veen et al. |
| 2012/0033874 A1 | 2/2012 | Perronnin |
| 2012/0066590 A1 | 3/2012 | Harris et al. |
| 2012/0072978 A1 | 3/2012 | DeLuca |
| 2012/0092345 A1 | 4/2012 | Joshi et al. |
| 2012/0102176 A1 | 4/2012 | Lee et al. |
| 2012/0102391 A1 | 4/2012 | Lee et al. |
| 2012/0127069 A1 | 5/2012 | Santhiveeran et al. |
| 2012/0134590 A1 | 5/2012 | Petrou |
| 2012/0215640 A1 | 8/2012 | Ramer et al. |
| 2012/0288190 A1 | 11/2012 | Tang |
| 2012/0306852 A1 | 12/2012 | Taylor |
| 2012/0307263 A1 | 12/2012 | Ichikawa et al. |
| 2012/0323694 A1 | 12/2012 | Lita et al. |
| 2012/0323971 A1 | 12/2012 | Pasupuleti |
| 2013/0033498 A1 | 2/2013 | Linnerud |
| 2013/0120396 A1 | 5/2013 | Kaplan |
| 2013/0127872 A1 | 5/2013 | Kaplan |
| 2013/0156302 A1 | 6/2013 | Rodriguez Serrano et al. |
| 2013/0163027 A1 | 6/2013 | Shustef |
| 2013/0179761 A1 | 7/2013 | Cho |
| 2013/0215126 A1 | 8/2013 | Roberts |
| 2013/0215133 A1 | 8/2013 | Gould et al. |
| 2013/0321617 A1 | 12/2013 | Lehmann |
| 2013/0326348 A1 | 12/2013 | Ip et al. |
| 2014/0025756 A1 | 1/2014 | Kamens |
| 2014/0047329 A1 | 2/2014 | Levantovsky et al. |
| 2014/0136957 A1 | 5/2014 | Kaasila et al. |
| 2014/0153012 A1 | 6/2014 | Seguin |
| 2014/0176563 A1 | 6/2014 | Kaasila et al. |
| 2014/0195903 A1 | 7/2014 | Kaasila et al. |
| 2014/0281916 A1 | 9/2014 | Kaasila et al. |
| 2015/0062140 A1 | 3/2015 | Levantovsky et al. |
| 2015/0074522 A1 | 3/2015 | Harned, III et al. |
| 2015/0097842 A1 | 4/2015 | Kaasila et al. |
| 2015/0100882 A1 | 4/2015 | Severenuk |
| 2015/0193386 A1 | 7/2015 | Wurtz |
| 2015/0278167 A1 | 10/2015 | Arnold et al. |
| 2015/0339273 A1 | 11/2015 | Yang et al. |
| 2015/0339543 A1 | 11/2015 | Campanelli et al. |
| 2015/0378297 A1 | 12/2015 | Kaasila et al. |
| 2016/0170940 A1 | 6/2016 | Levantovsky |
| 2016/0171343 A1 | 6/2016 | Kaasila et al. |
| 2016/0182606 A1 | 6/2016 | Kaasila et al. |
| 2016/0246762 A1 | 8/2016 | Eaton |
| 2016/0307347 A1 | 10/2016 | Matteson et al. |
| 2016/0321217 A1 | 11/2016 | Ikemoto et al. |
| 2016/0371232 A1 | 12/2016 | Ellis et al. |

FOREIGN PATENT DOCUMENTS

| | | |
|---|---|---|
| EP | 2857983 | 4/2015 |
| JP | 06-258982 | 9/1994 |
| JP | 10-124030 | 5/1998 |
| JP | 2002-507289 | 3/2002 |
| JP | 05-215915 | 8/2005 |
| JP | 05-217816 | 8/2005 |
| JP | 07-011733 | 1/2007 |
| TW | 544595 | 8/2003 |
| TW | 2005/11041 | 3/2005 |
| WO | WO 94/23379 | 10/1994 |
| WO | WO 99/00747 | 1/1999 |
| WO | WO 01/91088 | 11/2001 |
| WO | WO 03/023614 | 3/2003 |
| WO | WO 2004/012099 | 2/2004 |
| WO | WO 2005/001675 | 1/2005 |

OTHER PUBLICATIONS

Font Pair, [online]. "Font Pair", Jan. 20, 2015, Retrieved from URL: http://web.archive.org/web/20150120231122/http://fontpair.co/, 31 pages.

Typeconnection, [online]. "typeconnection", Feb. 26, 2015, Retrieved from URL: http://web.archive.org/web/20150226074717/http://www.typeconnection.com/step1.php, 4 pages.

"A first experiment with multicoloured web fonts," Manufactura Independente website, Feb. 28, 2011, Retrieved from the internet: http://blog.manufacturaindependente.org/2011/02/a-first-experiment-with-multicoloured-web-fonts/.

Adobe Systems Incorporated, "The Type 42 Font Format Specification," Technical Note #5012, Jul. 31, 1998, pp. 1-24.

Adobe Systems Incorporated, "PostScript Language Reference—Third Edition," Feb. 1999, pp. 313-390.

Adobe Systems Incorporated, "To Unicode Mapping File Tutorial," Adobe Technical Note, XP002348387, May 2003.

"Announcing Speakeasy: A new open-source language tool from Typekit," Oct. 28, 2010, on-line http://blog.typekit.com/2010/10/28/announcing-speakeasy-a-new-open-source-language-tool-from-typekit/.

Apple Computers, "The True Type Font File," Oct. 27, 2000, pp. 1-17.

Celik et al., "W3C, CSS3 Module: Fonts," W3C Working Draft, Jul. 31, 2001, pp. 1-30.

(56) References Cited

OTHER PUBLICATIONS

"Colorfont/v1," Feb. 28, 2011, retrieved from the internet: http://manufacturaindependente.com/colorfont/v1/.
Doughty, Mike, "Using OpenType® Fonts with Adobe® InDesign®," Jun. 11, 2012 retrieved from the internet: http://webarchive.org/web/20121223032924/http://www.sketchpad.net/opentype-indesign.htm (retrieved Sep. 22, 2014), 2 pages.
European Search Report, 14184499.3, Jul. 13, 2015, 7 pages.
European Search Report, 14187549.2, Jul. 30, 2015, 7 pages.
European Search Report, 13179728.4, Sep. 10, 2015, 3 pages.
Extensis, Suitcase 10.2, Quick Start Guide for Macintosh, 2001, 23 pgs.
"Flash CS4 Professional ActionScript 2.0", 2007, retrieved on http://help.adobe.com/en_US/AS2LCR/Flash_10.0/help.html?content=00000284.html on Aug. 31, 2015.
Goswami, Gautum, "Quite 'Writly' Said!," One Brick at a Time, Aug. 21, 2006, Retrieved from the internet: :http://gautamg.wordpress.com/2006/08/21/quj.te-writely-said/ (retrieved on Sep. 23, 2013), 3 pages.
International Preliminary Report on Patentability issued in PCT application No. PCT/US2013/071519 dated Jun. 9, 2015, 9 pages.
International Search Report & Written Opinion issued in PCT application No. PCT/US10/01272, mailed Jun. 15, 2010, 6 pages.
International Search Report & Written Opinion issued in PCT application No. PCT/US2011/034050 dated Jul. 15, 2011, 13 pages.
International Search Report & Written Opinion, PCT/US2013/026051, mailed Jun. 5, 2013, 9 pages.
International Search Report & Written Opinion, PCT/US2013/071519, mailed Mar. 5, 2014, 12 pages.
International Search Report & Written Opinion, PCT/US2013/076917, mailed Jul. 9, 2014, 11 pages.
International Search Report & Written Opinion, PCT/US2014/010786, mailed Sep. 30, 2014, 9 pages.
Japanese Office Action, 2009-521768, mailed Aug. 28, 2012.
Japanese Office Action, 2013-508184, mailed Apr. 1, 2015.
Ma Wei-Ying et al., "Framework for adaptive content delivery in heterogeneous network environments", Jan. 24, 2000, Retrieved from the Internet: http://www.cooltown.hp.com/papers/adcon/MMCN2000.
Open Text Exceed, User's Guide, Version 14, Nov. 2009, 372 pgs.
"Photofont.com—Use photofonts," Sep. 2, 2012, retrieved from the internet: http://web.archive.org/web/20120902021143/http://photofont.com/photofont/use/web.
"Saffron Type System", retrieved from the internet Nov. 12, 2014, 7 pages.
Saurabh, Kataria et al., "Font retrieval on a large scale: An experimental study", 2010 $17^{th}$ IEEE International Conference on Image Processing (ICIP 2010); Sep. 26-29, 2010; Hong Kong, China, IEEE, Piscataway, NJ, USA, Sep. 26, 2010, pp. 2177-2180.
Supplementary European Search Report, European Patent Office, European patent application No. EP 07796924, dated Dec. 27, 2010, 8 pages.
TrueType Fundamentals, Microsoft Typography, Nov. 1997, pp. 1-17.
Universal Type Server, Upgrading from Suitcase Server, Sep. 29, 2009, 18 pgs.
Wenzel, Martin, "An Introduction to OpenType Substitution Features," Dec. 26, 2012, Retrieved from the internet: http://web.archive.org/web/20121226233317/http://ilovetypography.com/OpenType/opentype-features. Html (retrieved on Sep. 18, 2014), 12 pages.
Forums.macrumors.com' [online]. "which one is the main Fonts folder?" May 19, 2006, [retrieved on Jun. 19, 2017]. Retrieved from the Internet: URL<https://forums.macrumors.com/threads/which-one-is-the-main-fontsfolder 202284/>, 7 pages.
International Preliminary Report on Patentability issued in PCT application No. PCT/US2015/066145 dated Jun. 20, 2017, 7 pages.

```
                                                                500
function [J grad] = nnCostFunction(nn_params, ...

input_layer_size, ...

hidden_layer_size, ...

num_labels, ...

FontFeatures_X1, isFontAClosetoBLearn, FontFeatures_X2,
lambda,alpha)
%   NNCOSTFUNCTION Implements the neural network cost function for a two
layer
%   neural network which performs regression %   [J grad] = NNCOSTFUNCTON(nn_params, input_layer_size, hidden_layer_size,
num_labels, ...

%   FontFeatures_X1, isFontAClosetoBLearn, FontFeatures_X2, lambda, alpha)
computes the cost and gradient of the neural network.

% for our 2 layer neural network

Theta1 = reshape(nn_params(1:hidden_layer_size * (input_layer_size + 1)), ...

hidden_layer_size, (input_layer_size + 1));

Theta2 = reshape(nn_params((1 + (hidden_layer_size * (input_layer_size +
1))):end), ...

num_labels, (hidden_layer_size + 1));
```

```
                                                                502
% Setup variables m = size(FontFeatures_X1, 1);

% This function will compute and then return following
variables

J = 0;

Theta1_grad = zeros(size(Theta1));

Theta2_grad = zeros(size(Theta2));

% DO fontpair AB ****, feedforward pass though the neural
net

X         = [ones(m, 1) FontFeatures_X1];

a1        = X;

z2        = a1 * Theta1';

a2        = sigmoid(z2);

a2        = [ones(size(a2, 1),1) a2];

z3        = a2 * Theta2';

a3        = sigmoid(z3); % output of neural net a1_AB     = a1;

a2_AB     = a2;

z2_AB     = z2;

a3_AB     = a3; % ESTIMATED distance between font A and B
```

FIG. 5

```
600
% DO fontpair AC ****, feedforward pass though the neural net
X            = [ones(m, 1) FontFeatures_X2];
a1           = X;
z2           = a1 * Theta1';
a2           = sigmoid(z2);
a2           = [ones(size(a2, 1),1) a2];
z3           = a2 * Theta2';
a3           = sigmoid(z3);  % output of neural net
a1_AC  = a1;
a2_AC  = a2;
z2_AC  = z2;
a3_AC  = a3; % ESTIMATED distance between font A and C a1 = 0; a2 = 0; z2 = 0; a3 = 0;

% guess >= 0.5 means we guessed A is closer to B, guess varies between 0 and 1
guess = a3_AC ./ (a3_AB .+ a3_AC);

delta    = zeros(size(a3_AB,1), 1);
```

```
602
% Set delta to contain values between -1 and +1, zero means correct guess.

% We drive towards isFontAClosetoBLearn which is 0 or 1 intentionally, to create a very overcontrained situation.

% The overconstraing will create a solution where we have values in between 0 and 1 which we can view as distances.

% Of course a neural net can also not reach exactly 0 or 1, but it can get close.

delta    = guess - isFontAClosetoBLearn;

%printf("delta = %f, %f, %f, %f, %f\n", delta(1), delta(2), delta(3), delta(4), delta(5));

% compute cost

% J = sum(sum((-y .* log(a3))-((1-y) .* log(1-a3)))) / m;

% J=sum(sum( (a3-y) .^ 2)) / (2*m);

J=sum(sum( delta .^ 2)) / (2*m);

% printf("cost = %f\n", J)

% add regularization, start at column 2 instead of 1 to skip the first constant column J += (lambda/(2*m)) * (sum(sum((Theta1(:,2:end)).^2)) + sum(sum((Theta2(:,2:end)).^2)));

%alpha           = 0.95; % learning rate, the value is passed into the function
```

FIG. 6

```
                                                              700
% Font pair A and B z2              = z2_AB;

a2              = a2_AB;

a1              = a1_AB;

delta_3         = -delta * alpha;

delta_2         = (delta_3 * Theta2(:,2:end)) .*
sigmoidGradient(z2);

Theta1_grad     = ((1/m) * (delta_2' * a1));

Theta2_grad     = ((1/m) * (delta_3' * a2));

% Font pair A and C z2              = z2_AC;

a2              = a2_AC;

a1              = a1_AC;

delta_3         = delta * alpha;

delta_2         = (delta_3 * Theta2(:,2:end)) .*
sigmoidGradient(z2);

Theta1_grad     += ((1/m) * (delta_2' * a1));

Theta2_grad     += ((1/m) * (delta_3' * a2));
```

```
                                                              702
% since we want the average of the Theta1_grad and Theta2_grad
based on both the AB and AC pass Theta1_grad *= 0.5;

Theta2_grad *= 0.5;

Theta1_grad    += ((lambda/m) * (Theta1));

Theta2_grad    += ((lambda/m) * (Theta2));

% undo regularization term for first column

Theta1_grad(:,1) -= ((lambda/m) * (Theta1(:,1)));

Theta2_grad(:,1) -= ((lambda/m) * (Theta2(:,1)));

% Unroll gradients grad = [Theta1_grad(:) ; Theta2_grad(:)];

end
```

FIG. 7

```
String generateSimilarList3(int a_font)                                                    900
{
    String tempStr ="";
    ArrayList<Integer> selectedfont =new ArrayList<Integer>();
    tempStr +=a_font;
    selectedfont.add(a_font);
    TreeMap<Integer,Float> font_list = getFontList(a_font);
    for(int j =font_list.size()-1;j>=396;j--)
    {
        selectedfont.add((Integer) font_list.keySet().toArray()[j]);
    } float AscListDist= getSumDistance(selectedfont);
    ArrayList<Integer> selectedSortedfontList =new ArrayList<Integer>();
    selectedSortedfontList = (ArrayList<Integer>) selectedfont.clone();
    float minCost = 999,tempCost=999;;
    int targetPos =-1;
    int index[] =new int[]{-1};
    int actualPos;
    while(true)
    {
        targetPos =-1;
        actualPos =-1;
        for(int i=1;i<selectedSortedfontList.size()-1;i++)
        {
            tempCost = getCostValue(selectedSortedfontList, i,index,AscListDist);
            if(minCost>tempCost)
            {
                actualPos = i;
                targetPos = index[0];
                minCost=tempCost;
            }
        }
```

FIG. 9

```
                                                                    1000
if(targetPos == actualPos)
            {
                    break;
            }
            else
            {
                    int elem = selectedSortedfontList.get(actualPos);
                    selectedSortedfontList.remove(actualPos);
                    selectedSortedfontList.add(targetPos, elem);
                    System.out.println(getSumDistance(selectedSortedfontList));
            }
        }
        selectedSortedfontList.remove(0);
        tempStr =selectedSortedfontList.toString();
        selectedfont.remove(selectedfont);
        return tempStr;
    }
```

FIG. 10

```
float getCostValue(ArrayList<Integer> list, int position, int []bestIndex,float origDist)     1100
{
        float T=0.0f;
        float cost=999,locCost = 999;
        int element = list.get(position);
        list.remove(position);
        for(int i=1;i<list.size()-1;i++)
        {
                list.add(i, element);
                locCost = (float) (getSumDistance(list)*T+(1-T)*(origDist)*Math.pow((position-i)*(0.01), 2));
                if(cost>locCost)
                {
                        cost = locCost;
                        bestIndex[0] = i;
                }
                list.remove(i);
        }
        if(bestIndex[0] == position)
                cost =999;
        list.add(position, element);
        return cost;
}
```

FIG. 11

ANALYZING FONT SIMILARITY FOR PRESENTATION

CLAIM OF PRIORITY

This application is a continuation application and claims priority under 35 U.S.C. §120 to U.S. patent application Ser. No. 14/046,609, filed on Oct. 4, 2013, the entire contents of which are hereby incorporated by reference.

BACKGROUND

This description relates to quantifying font similarity for identification and presentation. Once presented, the displayed fonts may be selected for various applications to present textual content on imaging devices like printers, computing devices, etc.

The astronomical growth of available textual content on the Internet has lead users to demand more variety to express this content. Similar to the variety of products provided by physical and online stores, content authors, publishers and viewers have grown to expect a wide assortment of content viewing formats, such as different fonts to view text-based assets. However, this explosion of content and potential presentation formats can become overwhelming and easily saturate the casual viewer. Faced with such an overabundance of information, decision-making abilities can be inhibited and the visual experience of a viewer degraded.

SUMMARY

The systems and techniques described can aid online viewers by improving their ability to select fonts. By determining multiple fonts to be similar, the identified fonts can be categorized and presented in a manner that allows an online viewer (e.g., shopper) to quickly recognize font similarities and differences. Furthermore, by grouping fonts based upon their similarities, a viewer can quickly jump among groups of similar fonts and, with minimal delay, address the old shopping adage "show me more like this." By improving their ability to navigate among many font types, viewers can be alerted to different fonts and variations not previously known to them. While many methodologies may be employed to provide such functionality, artificial intelligence techniques, such as machine learning, can exploit such fonts, their similarities, and differences for training and evaluation. By developing such techniques to quantify font similarities, applications, such as font development and font policing, can be improved along with general viewing of font varieties.

In one aspect, a computing device implemented method includes receiving data representing features of a first font and data representing features of a second font. The first font and the second font are capable of representing one or more glyphs. The method also includes receiving survey-based data representing the similarity between the first and second fonts, and, training a machine learning system using the features of the first font, the features of the second font and the survey-based data that represents the similarity between the first and second fonts.

Implementations may include one or more of the following features. Training the machine learning system may include calculating a level of similarity between the first font and the second font from the first font features and the second font features. Calculating the level of similarity may include determining the difference between features of the first font and corresponding features of the second font. Training the machine learning system may include comparing the calculated level of similarity between the first and second fonts and a value that represents the similarity between the first and second fonts from the survey-based data. Training the machine learning system may include calculating a cost function from the features of the first font, the features of the second font and the survey-based data that represents the similarity between the first and second fonts. Training the machine learning system may include minimizing the cost function. The machine learning system may implement a neural network. The method may include using the machine learning system to determine a level of similarity for a pair of fonts, in which the pair of fonts excludes the first font and the second font. The method may include using the machine learning system to determine a level of similarity for a pair of fonts, in which the pair of fonts includes at least one of the first font and the second font. The method may include producing a list of fonts for presentation based on the level of similarity for the font pair. The produced list may include a selected focus font. The presented order of fonts in the produced list may be based upon a level of similarity between a focus font and other fonts. The presented order of fonts in the produced list may be based upon a level of similarity between fonts other than a focus font. The presented order of the fonts in the produced lists may be based upon a level of similarity between a focus font and other fonts, and, a level of similarity between fonts other than a focus font. A histogram representing pixels may be used to calculate at least one of the features of the first font. At least one of the features of the first font may represent the use of stenciling in the font. A standard deviation of the amount of grey present in a glyph may be used to calculate at least one of the features of the first font. The features of a first font may be produced from one or more bitmap images rendered by the machine learning system.

In another aspect, a system includes a computing device that includes a memory configured to store instructions. The system also includes a processor to execute the instructions to perform operations that include receiving data representing features of a first font and data representing features of a second font. The first font and the second font are capable of representing one or more glyphs. Operations also include receiving survey-based data representing the similarity between the first and second fonts, and, training a machine learning system using the features of the first font, the features of the second font and the survey-based data that represents the similarity between the first and second fonts.

Implementations may include one or more of the following features. Training the machine learning system may include calculating a level of similarity between the first font and the second font from the first font features and the second font features. Calculating the level of similarity may include determining the difference between features of the first font and corresponding features of the second font. Training the machine learning system may include comparing the calculated level of similarity between the first and second fonts and a value that represents the similarity between the first and second fonts from the survey-based data. Training the machine learning system may include calculating a cost function from the features of the first font, the features of the second font and the survey-based data that represents the similarity between the first and second fonts. Training the machine learning system may include minimizing the cost function. The machine learning system may implement a neural network. Operations may include using the machine learning system to determine a level of similarity for a pair of fonts, in which the pair of fonts excludes the first font and the second font. Operations may include using the machine learning system to determine a level of similarity for a pair of fonts, in which the pair of fonts includes at least one of the first font and the second font. Operations may include producing a list of fonts for presentation based on the level of similarity for the font pair. The produced list may include a selected focus font. The presented order of fonts in the produced list may be based upon a level of similarity between a focus font and other fonts. The presented order of fonts in the produced list may be based upon a level of similarity between fonts other than a focus font. The presented order of the fonts in the produced lists may be based upon a level of similarity between a focus font and other fonts, and, a level of similarity between fonts other than a focus font. A histogram representing pixels may be used to calculate at least one of the features of the first font. At least one of the features of the first font may represent the use of stenciling in the font. A standard deviation of the amount of grey present in a glyph may be used to calculate at least one of the features of the first font. The features of a first font may be produced from one or more bitmap images rendered by the machine learning system.

In another aspect, one or more computer readable media storing instructions that are executable by a processing device, and upon such execution cause the processing device to perform operations that include receiving data representing features of a first font and data representing features of a second font. The first font and the second font are capable of representing one or more glyphs. Operations also include receiving survey-based data representing the similarity between the first and second fonts, and, training a machine learning system using the features of the first font, the features of the second font and the survey-based data that represents the similarity between the first and second fonts.

Implementations may include one or more of the following features. Training the machine learning system may include calculating a level of similarity between the first font and the second font from the first font features and the second font features. Calculating the level of similarity may include determining the difference between features of the first font and corresponding features of the second font. Training the machine learning system may include comparing the calculated level of similarity between the first and second fonts and a value that represents the similarity between the first and second fonts from the survey-based data. Training the machine learning system may include calculating a cost function from the features of the first font, the features of the second font and the survey-based data that represents the similarity between the first and second fonts. Training the machine learning system may include minimizing the cost function. The machine learning system may implement a neural network. Operations may include using the machine learning system to determine a level of similarity for a pair of fonts, in which the pair of fonts excludes the first font and the second font. Operations may include using the machine learning system to determine a level of similarity for a pair of fonts, in which the pair of fonts includes at least one of the first font and the second font. Operations may include producing a list of fonts for presentation based on the level of similarity for the font pair. The produced list may include a selected focus font. The presented order of fonts in the produced list may be based upon a level of similarity between a focus font and other fonts. The presented order of fonts in the produced list may be based upon a level of similarity between fonts other than a focus font. The presented order of the fonts in the produced lists may be based upon a level of similarity between a focus font and other fonts, and, a level of similarity between fonts other than a focus font. A histogram representing pixels may be used to calculate at least one of the features of the first font. At least one of the features of the first font may represent the use of stenciling in the font. A standard deviation of the amount of grey present in a glyph may be used to calculate at least one of the features of the first font. The features of a first font may be produced from one or more bitmap images rendered by the machine learning system.

These and other aspects, features, and various combinations may be expressed as methods, apparatus, systems, means for performing functions, program products, etc.

Other features and advantages will be apparent from the description and the claims.

DESCRIPTION OF DRAWINGS

FIGS. 5-7 illustrate programming instructions for calculating a cost function.

FIGS. 9-11 illustrate programming instructions for ordering fonts in a list.

DETAILED DESCRIPTION

Figure 1:
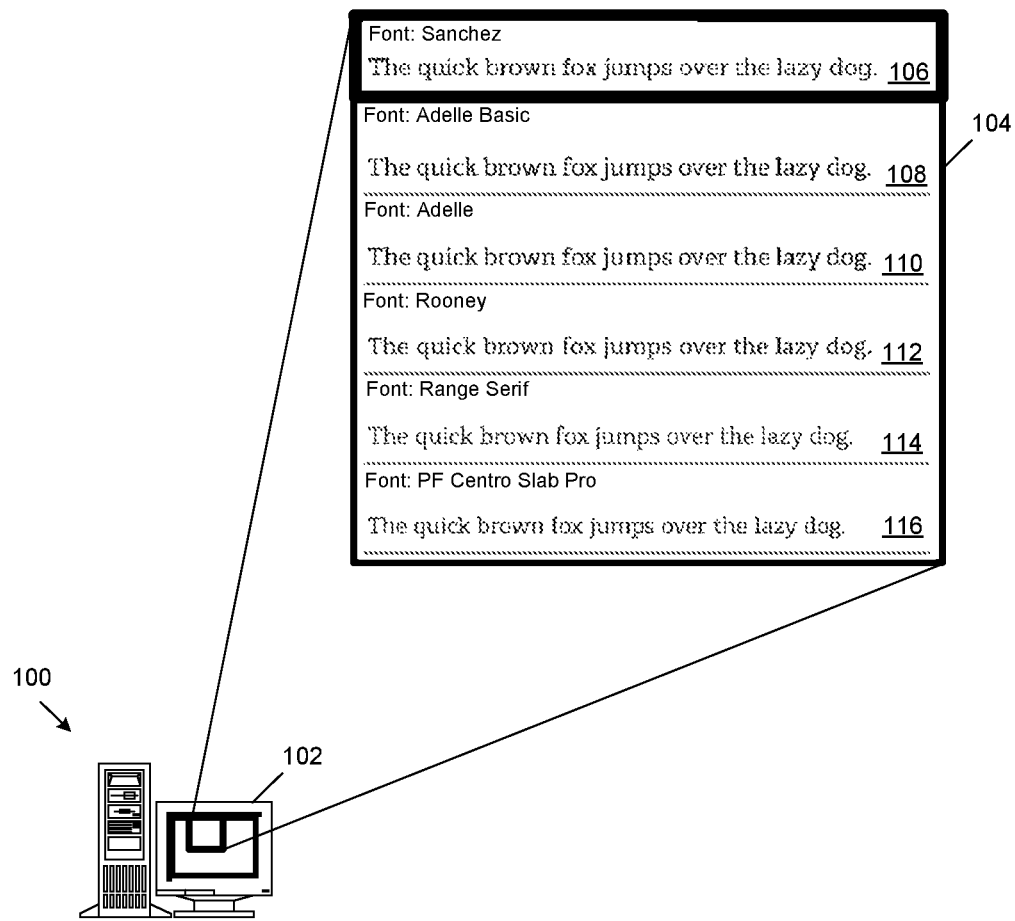
FIG. 1 illustrates a computer menu used to select from groups of similar fonts.

Referring to FIG. 1, a computing device (e.g., computer system 100) includes a display 102 that allows a user to create, review, edit, etc. various types of content, such as text, via one or more applications. Along with presenting different content from a variety of sources (e.g., Internet sites), browsers and other applications (e.g., word processors) may allow the alteration of presented text characteristics. For example, to provide a desired effect, the font used to represent the text may be changed. However, with an ever-increasing number of fonts at a user's disposal, selecting an appropriate font for the project at hand could be an extremely time-consuming task. To reduce such a potential time sink, one or more techniques may be implemented to make a user's time to review available fonts more efficient and navigating to one font (or a small font collection) easier for creating, editing, etc., one or more assets (e.g., an electronic document, web page, web site, etc.).

In the illustrated example, a drop-down menu 104 is presented (e.g., as requested by the user) to present potential fonts for selection. In some arrangements, sample text is used to present the possible selections, however, in other arrangements user-selected text (e.g., highlighted in an electronic document being created) may be used for presenting font similarities and differences. An upper-most entry 106 in the menu 104 presents one particular font (referred to as a focus font) from which the fonts in lower entries 108, 110, 112, 114, 116 are identified. In general, one or more similarity measures are calculated to identify the fonts presented in entries 108-116 and how to order the entries such that more similar fonts are positioned closer to the focus font (e.g., the font in entry 108 is considered more similar to the focus font in entry 106 than the font in entry 110). By providing a continuum of fonts similar to the focus font, a user can relatively easily identify and select which font is more desirable for the current project.

In this arrangement, a selected font is defined as the focus font and is moved to inhabit the upper most entry 106. For example, if a user selects (e.g., by using a pointing device such as a mouse) the font in entry 112 (e.g., titled "Rooney"), that particular font is presented in entry 106. Additionally, along being defined and presented as the new focus font, the fonts presented in entries 108-116 may change (e.g., new fonts represented in the entries, previously presented fonts reordered or removed, etc.) based upon the similarity of the new focus font (e.g., "Rooney") and other fonts which may or may not have been presented when the previous focus font (e.g., titled "Sanchez") resided in the upper most entry 106.

Along with selecting a font from the listing of similar fonts (e.g., presented in entries 108-116), one or more other techniques may be implemented for establishing a focus font that resides in the upper most entry 106. For example, a collection of introductory fonts may be presented for the initial focus font selection or later selection. Such introductory fonts may span a wide variety of font types and may allow the user to select from extremely different fonts (e.g., block-lettering fonts, script type fonts, etc.). To present these upper-level introductory fonts, one or more techniques may be employed. For example, by interacting with the entry 106 (e.g., using a pointing device to drag the entry 106 to the viewer's left or right) other font types may be represented in the entry 106 and can serve as the focus font. Other techniques may also be implemented; for example, the user may be directed to another menu, screen, etc. to select a focus font (to be represented in the entry 106). Selecting a font (e.g., a focus font) for identifying similar (or different) fonts may also employ the use one or more applications, functions, software modules, etc. For example, by highlighting textual content being presented by an application (executed on a computing device), a font may be selected. For instance, using a pointing device (e.g., a mouse) a user can define a bounding box to encircle text (e.g., a letter, word, phrase, etc.) being presented (e.g., in a website being shown by a web browser application). Once highlighted, the text may be provided to a software module (that may execute in concert with the web browser or independently) and font information may be extracted from the selected text (e.g., glyph outlines, etc.) that may be used for identifying similar fonts. Such a technique allows a computer user to casually notice a font of interest (at any time) and simply select a sample of the font for determining similar fonts and potentially being presented samples of the similar fonts.

Similar to presenting different types of fonts, the menu-based system may also allow a user to navigate among other types of text representations. For example, fonts associated with different languages may be presented to allow user selection. Also, rather than presenting such similar fonts in a drop-down menu, other types of presentation techniques may be employed (e.g., icon based representations of the fonts, a dedicated graphical window, etc.).

Figure 2:
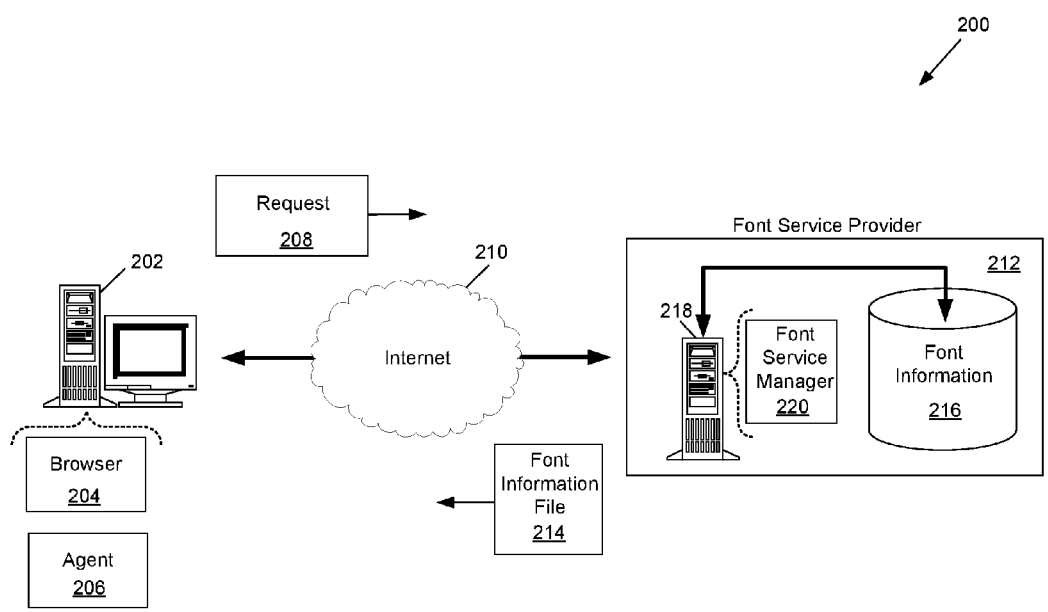
FIG. 2 is a block diagram of an Internet based computer network that provides font similarity information.

Referring to FIG. 2, a computing environment 200 is presented that includes a computer system 202 that a user may interact with (using a keyboard, a pointing device, etc.) to select one or more fonts (e.g., by interacting with the menu 104). Additionally, the computer system 202 may execute one or more applications (e.g., a browser 204) for attaining font information (e.g., exchanges information with the menu 104). New fonts, which are frequently being developed, and current fonts, which may be adjusted and updated (e.g., to address new display technology), may become available for potential selection and use on the computer system 202. To deliver this font information (e.g., identified fonts, similar fonts, etc.) to the computer system 202 for presentation and possibly selection (e.g., for use in an executed application such as a word processor), one more techniques may be employed.

Similar to the browser 204, other types of executable objects may be used for attaining the appropriate font information for presentation (e.g., in the drop-down menu 104). For example, the computer system 202 may execute a software agent 206 to request appropriate font information (e.g., fonts determined to be similar to a selected focus font) if needed (e.g., the agent may assist the computer system 202 in tracking resident and non-resident fonts). If font information is determined to be absent (e.g., fonts determined to be similar to a selected focus font are absent), one or more operations may be executed by the software agent 206 alone or in concert with the computer system 202. For example, the software agent 206 may initiate sending a request 208 to attain the appropriate font information, e.g., for presenting a focus font and other fonts determined to be similar to the focus font. Such agents can be considered a software module that is executable in a substantially autonomous manner. For example, upon being provided access to the computer system 202, a software agent may operate without considerable user interaction. By operating in a somewhat flexible manner, the software agent can adaptively address font information needs. The software agent 206 may operate in a somewhat persistent manner for identifying information associated with fonts determined to be similar to a focus font. For example, the software agent 206 may execute in a substantially continuous manner.

In the presented environment 200, the request 208 is sent over one or more networks (e.g., the Internet 210) to a font service provider 212 for processing (e.g., identifying and providing the requested font information). Once the needed information is produced, one or more techniques may be implemented to provide it to the computer system 202. For example, one or more files, such as a font information file 214, may be produced by the font service provider 212 and sent to the computer system 202. In some arrangements, the font service provider 212 may also provide the software agents to the computing devices in order to perform operations, such as requesting font information, as needed. Agents delivered from the font service provider 212 may also provide other functions; for example, the agents may direct the deletion of provided fonts based on one or more conditions (e.g., expired license term, expired period of time, etc.).

To provide the appropriate font information to the computer system 202 (e.g., via the software agent 206), the font service provider 212 typically needs access to one or more libraries of fonts, font information, etc. that may be stored locally or remotely. For example, font libraries and libraries of font information may be stored in a storage device 216

(e.g., one or more hard drives, CD-ROMs, etc.) on site. Being accessible by a server 218, the libraries may be used, along with information provided from software agents, to attain the appropriate font information (e.g., identify fonts similar to a focus font). Illustrated as being stored in a single storage device 216, the font service provider 212 may also use numerous storage techniques and devices to retain collections of fonts and related font information (e.g., for different font styles, languages, etc.). Lists of fonts and fonts identified as being similar and one or more measures of similarities can also be stored (e.g., on the storage device 216) for later retrieval and use. The font service provider 212 may also access font information at separate locations as needed. For example, along with identifying similar fonts for the computer system 202, the server 218 may be used to collect needed information from one or more sources external to the font service provider 212 (e.g., via the Internet 210).

Along with providing needed font information, the font service provider 212 may contribute other functions. For example, font information may be prepared in advance by the font service provider 212 for future use. For example, as new fonts are developed, the font service provider 212 may categorize the new fonts and determine similarities with these fonts and previously produced fonts. Such preparation work could improve efficiency in providing font information regarding a new font to the computer system 202 and other potential recipient devices. To provide this functionally, the server 218 executes a font service manager 220, which, in general, manages the flow of received requests and the delivery of requested information. The font service manager 220 also manages fonts, data that represents similarities (or dissimilarities) among the fonts, storage for later retrieval, etc. As such, similar fonts may be quickly identified and provided to a requesting computing device (e.g., the computer system 202). In one arrangement, a database (or other technique for structuring and storing data) is stored at the font service provider 212 (e.g., on the storage device 216) and includes records that represent the similarities (or dissimilarities) among fonts. In some instances, the similarity information is identified in part from information provided by the request 208 (and other requests) sent to the font service provider 212 (e.g., from a software agent). Similarly, the font service provider 212 may perform operations (e.g., tracking, monitoring, etc.) regarding other types of information. For example, records may be stored that reflect particular fonts that have been requested from and provided to an individual computing device, type of computing device, etc.

Figure 3:
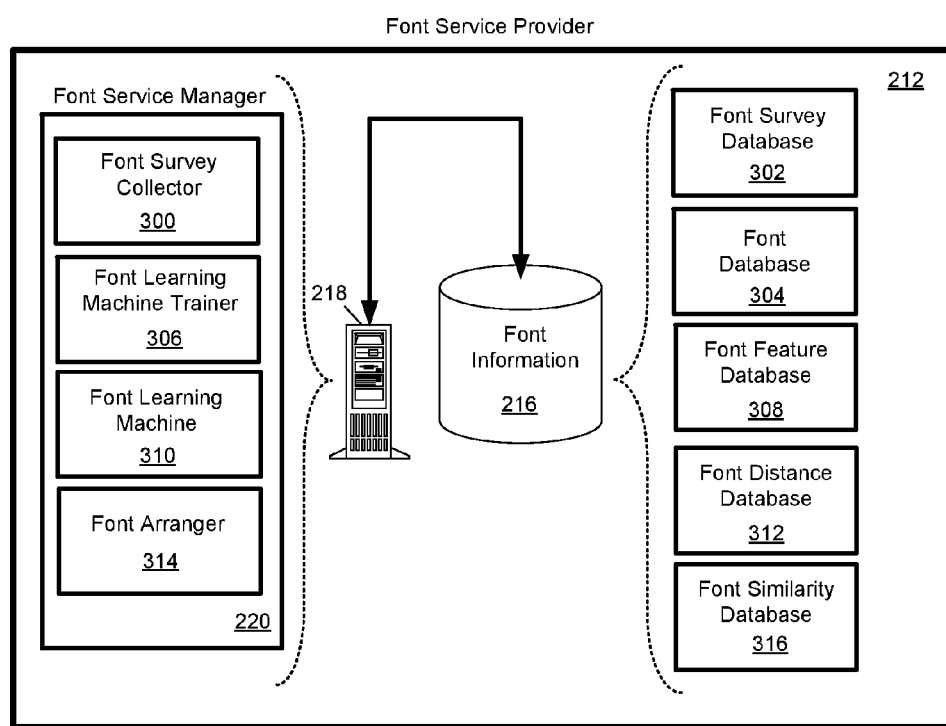
FIG. 3 is a block diagram of a font service provider that manages font similarity information.

Referring to FIG. 3, one or more techniques may be implemented to determine similarities between fonts and provide identified fonts to a computing device (e.g., the computer system 202). For such techniques, information may be used from one or more data sources. For example, data (e.g., survey data) may be collected that represents font similarities as decided by individuals (e.g., potential font users). For one type of survey, individuals may be presented samples of three fonts (e.g., font A, font B and font C). After being allowed to review each, a query may be presented in which the user is asked to select which pair of fonts are more similar (e.g., fonts A and B are more similar or fonts A and C are more similar). By collecting responses from a number of individuals for a variety of font comparisons (e.g., 500 to 100,000 similarity questions), noticeable trends may be detected among fonts, font families, etc. In some arrangements randomly selected fonts are used in the posed queries; however, other bases may be used (e.g., survey questions based on font use for different platforms, font sales data, etc.). In some examples, along with allowing the user to select which font pair is more similar, the query may also provide a non-committal response (e.g., "Impossible to say") for filtering out situations in which a survey-taker is unable to clearly identify one font pair as being more similar than another pair or when the fonts in both pairs are radically different from each other.

Along with the collected similarity information (e.g., from survey takers), other techniques may be used in concert for determining font similarities. One or more forms of artificial intelligence, such as machine learning, can be employed such that a computing process or device may learn to determine font similarities from training data, without being explicitly programmed for the task. Using this training data, machine learning may employ techniques such as regression to estimate font similarities. To produce such estimates, one or more quantities may be defined as a measure of font similarity. For example, the level of difference between two fonts may be defined as the distance between the fonts. One or more conventions may be utilized to define such distances between fonts; for example, a pair of fonts that have a relatively small distance can be considered similar. Alternatively a font pair that has a large distance can be considered different. As such, upon being trained, a learning machine may be capable of outputting a numerical value that represents the distance between two fonts. Input to the trained learning machine may take one or more forms. For example, representations of two fonts may be provided to the trained learning machine. One type of representation may be graphical representations of the fonts (e.g., a few or many characters represented in bitmaps images of the fonts). Numerical representations of the fonts may also be used as input to the trained learning machine. For example, particular features that uniquely describe each font may be provided to allow the trained learning machine to output a distance value for the input font pair. In some arrangements a machine learning system may be capable of rendering imagery from provided input. Once rendered, the imagery may be used to determine features that describe the fonts (e.g., to estimate similarity with another font). One or more files may also be used for providing font information from which font features may be produced. For example, a file including outline information of a font (e.g., an Open-Type font file or ".otf" file) may be input into a machine learning system and used to produce font features (from the font outlines). In some arrangements, the input file (or files) may be used by a renderer included in the machine learning system to produce an image (e.g., one or more bitmap images) to be used for feature determination.

To implement such an environment, one or more machine learning techniques may be employed. For example, supervised learning techniques may be implemented in which training is based on a desired output that is known for an input. Supervised learning can be considered an attempt to map inputs to outputs and then estimate outputs for previously unused inputs. Unsupervised learning techniques may also be used in which training is provided from known inputs but unknown outputs. Reinforcement learning techniques may also be employed in which the system can be considered as learning from consequences of actions taken (e.g., inputs values are known and feedback provides a performance measure). In some arrangements, the implemented technique may employ two or more of these methodologies. For example, the learning applied can be considered as not exactly supervised learning since the distance value between two fonts can be considered unknown prior to executing computations. While the distance value is unknown, the implemented techniques can check the computed font distances in concert with the collected survey data (e.g., in which a viewer identified if font A is closer to font B or to font C). By using both information sources regarding font similarity, reinforcement learning technique can be considered as being implemented.

In some arrangements, neural network techniques may be implemented using the survey as well as font data (e.g., vectors of numerical values that represent features of the fonts) to invoke training algorithms for automatically learning the fonts and related information, such as font similarity (e.g., distance values). Such neural networks typically employ a number of layers. Once the layers and number of units for each layer is defined, weights and thresholds of the neural network are typically set to minimize the prediction error through training of the network. Such techniques for minimizing error can be considered as fitting a model (represented by the network) to the training data. By using the survey data and the font data (e.g., font feature vectors), a function may be defined that quantifies error (e.g., a squared error function used in regression techniques). By minimizing error, a neural network may be developed that is capable of estimating font similarity. Other factors may also be accounted for during neutral network development. For example, a model may too closely attempt to fit data (e.g., fitting a curve to the extent that the modeling of an overall function is degraded). Such overfitting of a neural network may occur during the model training and one or more techniques may be implements to reduce its effects.

Illustrated in FIG. 3, the font service manager 220 (which includes a number of modules) is executed by the server 218 present at the font service provider 212. In this arrangement, the font service manager 220 includes a font survey collector 300 that is capable of retrieving data that represents font similarity selections as provided from survey-takers. In this arrangement, such data may be previously stored (e.g., in a font survey database 302) and retrieved from the storage device 216. Data representing such survey information may also be retrieved from one or more sources external to the font service provider 212; for example such information may be attained from one or more storage devices of a survey manager (e.g., an entity separate from the font service provider 212). Along with survey information, the storage device 216 (or other storage devices at the font service provider 212) may contain a font database 304 that includes information about numerous previously developed fonts, newly introduced fonts, fonts under development, etc. From the information stored in the font database 304, data may be retrieved for learning machine training and use, e.g., to determine font similarity (e.g., determine the distance between font pairs, etc.). For example, the font database 304 may include data that represents various types of font families (e.g., Times New Roman, Arial, etc.) that typically include a set of fonts (e.g., regular, italic, bold, bold italic, etc.). Data for each font may represent a set of individual character shapes (glyphs). Such glyphs generally share various design features (e.g., geometry, stroke thickness, serifs, size, etc.) associated with the font. One or more techniques may be utilized for representing such fonts; for example, outline-based representations may be adopted in which lines and curves are used to define the borders of glyphs. Along with differences based on design features, fonts may differ based on functional aspects, such as the languages (e.g., English, Chinese, Latin, etc.) for which the fonts are used. Fonts may be scalable for a variety of sizes (e.g., for presentation by various imaging devices) and may be represented in one or more formats. For example, scalable outline fonts may be represented in a format that includes data structures capable of supporting a variety of typographic visual symbols of many languages.

To train a learning machine (e.g., implemented as a neural network), the font service manager 220 includes a font learning machine trainer 306 that employs both font survey information and font data for training operations. In some arrangements, the trainer 306 may calculate numerical representations of font features (e.g., in vector form) for machine training. Various representations of the fonts (e.g., individual glyphs, etc.) may be used for computing the font features. For example, features may be computed from bitmap images of font glyphs, characters, etc. In some arrangements, the features are size invariant such that feature values are substantially equivalent for different font sizes (e.g., features for a 50-point bitmap are equivalent to a 100-point bitmap). To calculate the features, one or more techniques may be implemented; for example, a bounding box may be produced to define a boundary for isolating a font glyph, a font character, a word produced from font characters, etc. (e.g., to attain a measure of height, width, etc.).

A variety of font features may be used training and using machine learning. For example, tens of features (e.g., 30, 40 features) may be calculated for each font. One or more quantities may be used for defining such features. For example, a quantity may define border pixels positioned on the same horizontal line (e.g., the border pixels align along the 0 degree direction), border pixels that are positioned to the upper right or lower left of each other (e.g., border pixels align along the 45 degree direction), border pixels that are positioned on the same vertical line (e.g., the pixels align along the 90 degree direction), border pixels that are positioned to the upper left or lower right of each other (e.g., border pixels align along the 135 degree direction), etc. Selecting a portion or all of a font glyph may also be used for defining font feature. One or more techniques may be used for such selections (or highlighting of a glyph), for example, a bounding box may be employed such that a minimum sized graphical representation of a box encloses all pixels of the glyph (e.g., all non-white pixels). Other similar techniques may also be employed for defining glyphs.

One such feature may provide a measure of the slant present in a glyph or lack of slant (a vertically aligned glyph). Based upon the amount of slant, if any, each feature may be defined. For example, font features may be labeled as "Direction of the font 0 degree" (dir 0), "Direction of the font 45 degree" (dir 45), "Direction of font 90 degree" (dir 90), "Direction of the font 135 degree" (dir 135), etc. Generally, a font feature with relatively large value for dir90 or dir0 can be considered as being vertically oriented font (with no slant). Alternatively, a font with large value for dir45 or dir135 can be considered a font with slant. To identify such slants, one or more techniques may be implemented; for example, border pixels and non-border pixels may be identified. Border pixels can be considered as having at least one adjacent pixel (of eight possible adjacent pixels) that does not represent the glyph (e.g., the adjacent pixel is colored white). Border pixels may be used to calculate parameters (e.g., dir0, dir45, dir90, dir135) associated with slant directions based on surrounding pixels. For each detected white colored pixel, the corresponding parameter (e.g., dir0, dir45, dir90, dir135) may be incremented. After checking the entire glyph for pixels, each parameter may be divided by the total number of border pixels. In some arrangements, after calculating the direction features for each glyph (e.g., 52 glyphs, 26 small and 26 capital Latin alphabets) an average may be calculated for determining the direction feature for the font. These features can be considered size invariant.

Another font feature that may be produced can be considered as being associated with the center of gravity (e.g., identified as "center of gravity in X coordinate", "center of gravity in Y coordinate", etc.). The center of gravity (COG) can be defined as the point in a glyph from which all adjacent pixels represent a portion of the glyph (e.g., each pixel is non-white pixels in color in order to represent a glyph portion). If the COG is located in the middle of an image, the font can be considered symmetrical. The COG is located elsewhere, the font can be considered non-symmetrical. In one arrangement, to calculate COG in the x-direction, an image is scanned horizontally along its width. For each row, the COG is calculated, for example, by adding the indexes (e.g., position in the row) of the grey and black pixels in the row and dividing this sum by the number of grey and black pixels in the row. If the row is absent of grey or black pixels, the COG may be defined as being located at the middle of the row (e.g., one half the width of the bounding box). For a COG for the complete glyph in the x-direction, the COGs for each row may be added and divided by height of the glyph, the height of a bounding box, etc. Similar operations may be executed to determine the COG in the y-direction. For a COG of an entire font, COGs for each glyph (e.g., 52 glyphs, 26 small and 26 capital Latin alphabets) can be averaged.

For another feature, a quantity may be calculated that is associated with the distance from the center of gravity (referred to as "Average X distance from the Center of Gravity" and "Average Y distance from the Center of Gravity"). In general, this feature represents the distribution of pixels in a glyph. If the glyphs of the font are substantially condensed, the average x-distance and the average y-distance may be represented with relatively low values or even a zero value. Larger feature values may be calculated and represent more expanded glyphs. To calculate the average x-distance for a glyph, the distance of each glyph pixel (e.g., a grey or black pixel) is calculated from the font feature that represents the COG in the x-direction, in one arrangement. The values are summed and divided by the total number of pixels used by the glyph. To produce a size invariant average x-distance, divide the average x-distance by the width of a bounding image. Similar computations may be computed for an average y-distance from the font feature that represents the COG in the y-direction. Similar to the other features, a font feature may be calculated for the font by averaging appropriate distances for a set of glyphs of the font (e.g., 52 glyphs, 26 small and 26 capital Latin alphabets).

For another feature, an aspect ratio quantity may be calculated. Such a ratio may represent the ratio of height to width for a glyph. Such a feature may assist with the machine learning of relatively tall fonts, short fonts, etc. For one example, the aspect ratio may be calculated as:

$$\text{Aspect Ratio} = \text{Height}/(\text{Height}+\text{Width}).$$

However, the other aspect ratio definitions (e.g., that use different quantities) may be employed. To represent an entire font, aspect ratios may be calculated for each individual glyph (e.g., 52 glyphs, 26 small and 26 capital Latin alphabets) and averaged to attain an aspect ratio for the font.

Curviness is another feature that may be calculated that represents the amount of curves present in a font. One technique for calculating such a feature uses the count of glyph border pixels associated with slant angles of 45 or 135 degrees. Once the counts are determined, curviness can be calculated from a ratio:

$$\text{Curviness} = ((\text{borderCount45} + \text{borderCount135}))/\text{sqrt}(\text{Height}*\text{Width})).$$

Once the curviness feature is calculated for each individual glyph (52 glyphs, 26 small and 26 capital Latin alphabets) the quantity can be averaged to attain the curviness estimate of the entire font. This feature can be considered size invariant.

The average grey value can also be considered a feature for representing a font. In general, this feature can be considered as representing the heaviness or lightness of a font. In one example, the sum is calculated for pixel values (e.g., intensity values) that vary between 0 (e.g., representing the color white) and 1 (e.g., representing the color black). Once summed, the quantity is divided by the total pixel count for the glyph; for example, $\text{AvgGreyValue} = ((\text{totalGrey})/(\text{Height}*\text{Width}))$. Once calculated for each individual glyph (e.g., 52 glyphs, 26 small and 26 capital Latin alphabets), the quantities can be averaged to attain the average grey value for the font. This feature can be considered size invariant.

Another feature represents whether a font can be considered a script font or not. One technique for attaining this feature involves positioning a number of lines (e.g., five horizontal lines and five vertical lines) on particular glyphs (e.g., "T", "a", "o", "R", "W", "g", "h", "e"). Once positioned, each line is traversed to determine the number of instances that a color transition occurs (e.g., from the color black to the color white, vice-versa, etc.). The transition count provided by the vertical lines can be defined as the term "Y complexity" and the count from the horizontal lines can be defined as the "X complexity". In one implementation, X and Y complexity values may be calculated for particular glyphs (e.g., "T", "a", "o", "R", "W", "g", "h", and "e") and each value, combinations of the values, etc., may be used as individual features for the font. This feature can be considered size invariant.

Another feature may represent fonts based upon the width of a glyph. In one implementation, this feature may be calculated from the width of a string (e.g., "The quick brown fox jumps over the lazy dog.") at a relatively large point size (e.g., 72 point). If two fonts are generally similar, the value of the string width should be approximately equivalent.

One feature may represent skewness, which is associated with the inclination of a font. To calculate a quantity such as skewness of a glyph, the glyph is skewed by an amount (e.g., in degrees) until the bounding box of the image is minimized. This amount is defined as the skewness of the glyph. In some arrangements, skewness is calculated for particular glyphs (e.g., "H", "I", "T" and "1") and the individual skews are averaged to attain the skewness for the font. This feature can be considered size invariant.

Another feature may represent the width of a histogram for a glyph. A histogram may be defined such that columns represent the number of pixels located within each column along the x-axis. From the histogram, a standard deviation (or variance) is calculated for each column with respect to the average number of pixels in each column. The standard deviations (or variances) are divided by the width of an image bounding box for the glyph to produce a size invariant quantity. Once the feature is calculated for each individual glyph (e.g., 52 glyphs, 26 small and 26 capital Latin alphabets), the quantity can be averaged to attain a histogram for the font. In general, fonts such as swashy fonts, script fonts, etc. have distributions with lower value deviation.

Similar to a font feature for a histogram defined along the x-axis, a similar font may be defined for histograms defined along a y-axis. Once the font feature is computed for each individual glyph (e.g., 52 glyphs, 26 small and 26 capital Latin alphabets), the quantities can be averaged to attain the height histogram feature for the entire font. This feature may also be considered size invariant be executing one or more operations, for example, dividing the value by the height of the bounding box.

For another, a feature represents the stroke width of a font. In one arrangement, the average number of continuous non-white pixels (e.g., grey pixels) for each row along the x-direction of a glyph is identified for a range of heights (e.g., between 40 to 60% of the height of the glyph, in which the glyph has a substantially constant width). Once a numerical value is computed (for this feature) for individual glyphs (e.g., "T", "U", "L" and "I"), an average may be computed to attain the stroke width feature for the font. This feature may be considered size invariant by multiplying the stroke width by the ratio of a reference font size (e.g., 72 point) and the font size of the taken image.

Another feature is the corpus ratio, which refers to a ratio of the distance between the base line of the glyph "x" and the mean line to the cap height of the font. Along with the glyph "x", other glyphs may be used in the computation (e.g., "u", "v", "w", and "z"). In general, this feature calculates corpus size by dividing height of the small letter of "u", "v", "w", "x", and "z" by respective capital letters height and taking average of these values. This feature may be used for identifying fonts that employ all capital fonts, normal Latin fonts, etc. This feature can be considered size invariant.

Some features provide information regarding Latin fonts. For example, features may be computed in order to identify if a font is a Latin font or a symbolic font. If the font is a Latin font, the difference of glyph pair (E&F∥O&Q) is a relatively small amount, while in case of symbolic font, this difference is relatively larger. In general, the number of intersections for symbol fonts is relatively large and reflects the number of instances that there is a transition from a pixel of one color (e.g., white) to a pixel of another color (e.g., grey) and vice versa. Symbol fonts may also have a corpus ratio of approximately 1, meaning capital letters and small case letters are of similar size. For typical Latin fonts, this ratio has a lower value (e.g., 0.6). Also for symbol fonts, the average distance from the center of gravity is relatively large. In one arrangement, a determination may be defined as:

Font is Not Latin=Diffpercent*int_*x**pow(corpusRatio,4)*t_avgDist)/2

This feature can be considered size invariant as its parameters are each size invariant.

For yet another, a feature may be computed to identify typeface (serif or non-serif) of the font. In one arrangement, to calculate typeface of the font, an image of a glyph is horizontally skewed to minimize the bounding box which encloses the pixels of the glyph. Produce a histogram along the width of the glyph and calculate maximum height of the histogram. Next, identify columns of the histogram that have at least half of the maximum height and then count the pixels in the respective columns. Divide the pixel count by the total number of non-white pixels in the image. If this ratio is 1 or close to 1 then font can be considered a non-serif type, otherwise font can be considered a serif font. This feature can be calculated to different glyphs such as "I", "i" and "1", and an average can be computed for this feature of the font. This feature can be considered size invariant.

For another feature, a measurement may represent if a font is monospaced or not. In one arrangement, string widths may be determined for particular strings (e.g., "0WWM-Mmm0" and "00IIIIii0") in order to determine if the font is monospaced or not. Once the width values are determined, a value can be computed from the following instructions:

```
isMonoSpaced= (smallStringWIdth / bigStringWIdth) ^ 4;
if ( isMonoSpaced > 1 ) {
isMonoSpaced = 1 / isMonoSpaced;
}.
```

If the calculated value (labeled "isMonoSpaced") is approximately 1.0, the font can be considered monospaced. If the value is different from 1.0, the font can be considered as not being monospaced. This feature can be considered size invariant.

Another feature represents the x-height of a font, in which the x-height can be considered the distance between a base line of the glyph "x" and a mean line. Typically, this is the height of the letter "x" as well as the letters "u", "v", "w", and "z". This feature calculates height of the small letter of "u", "v", "w", "x", and then take average of these values. This feature is used to identify fonts as having small Latin letters or not. This feature can be considered size invariant by multiplying the value by the ratio of a reference font size (e.g., 72 point) and the font size in the taken image.

Still another feature represents the cap height of a font. Typically, this is the height of the letter "X" in the font, as well as letters "U", "V", "W", and "Z". This feature calculates height of capital letter of "U", "V", "W", "X", and "Z" and then computes average of these values. These features can be used to identify fonts having capital Latin letters or not. This feature can be considered size invariant by multiplying the value by the ratio of a reference font size (e.g., 72 point) and the font size in the taken image.

One feature may represent the contrast between differently oriented character strokes. For example, the feature may represent the contrast of strokes widths oriented in the x-direction and stroke widths oriented in the y-direction for a font. In one arrangement, the feature is calculated from the ratio of the horizontal width of a vertically oriented stroke (e.g., the horizontal width of the stroke that defines the vertical portion of the letter "I") and the vertical width of a horizontally oriented stroke (e.g., the vertical width of the horizontal stroke that defines the middle portion of the letter "H"). In some instances, multiple widths may be determined for a glyph and averaged. This feature can be considered size invariant.

Another feature may be used for classifying fonts based on glyph width. In one implementation, this feature may be calculated from the width of a string (e.g., "The quick brown fox jumps over the lazy dog.") at a relatively large point size (e.g., 72 point), and the calculated width is squared. If two fonts are generally similar, then the square values for each font are generally similar. If the two fonts are relatively dissimilar, the square values may also dissimilar. This feature can be considered size invariant as string width is size invariant.

For another font feature, the distribution of the grey values may be quantified. For example, initially the average grey value is calculated for each glyph (e.g., 52 glyphs).

Next the standard deviation is calculated and squared to produce the font feature. This feature can be considered size invariant.

For still another font feature represents if the font is absent lower case letters. Or, in other words, the feature represents if the font only includes capital letters. Such fonts include letters of the same shape, but some letters are sized as typical capital letters and some letters are small variants of the capital letters. Since the letters can be considered as only varying in size, the center of gravity of each letter is position at approximately the same position. The feature is calculated by determining the distance between the center of gravity for the lower case a letter (e.g., "b") and the capital version of the letter (e.g., "B"). In general, if the font includes just capital letters, the distance has an approximate value of 0. For distance values not approximate to 0, the font can be considered as having letters that include capital and lower case letters. This feature can be considered size invariant.

Another font feature quantifies whether the font can be considered filled. One technique for calculating this feature includes horizontally scanning a glyph to potentially identify if pixels change (during the progression) from the color grey to white and then from white to grey. Such a color progression can reflect if the glyph is filled or not (e.g., a pattern of continuous grey pixels may represent that the glyph is filled for that row). By completely scanning the image of the glyph, the number of filled rows and non-filled rows may be counted. These counts may be further processed, e.g., calculate the ratio of filled row count to total rows. The square of this ratio may also be taken. In some arrangements, these operations are executed for particular characters (e.g., "B", "D", "O" and "o"). Once a quantity is calculated for each character, an average may be calculated for representing the font. This feature can be considered size invariant as the ratio of completely filled rows is divided by image height.

Another feature attempts to represent if the font employs stencils. For one technique, the image of the glyph is vertically scanned and one or more columns are identified that are absent grey pixels. If the column represents a portion of the glyph, a ratio may be computed of the total black pixels in the glyph to the white pixels. The ratio may then be squared. A value of "0" is used to represent if the glyph is not present in the column. If stencils are present, a relatively large value is provided by the ratios. Values near "0" represent fonts absent stencils. The image of the glyph may also be scanned horizontally within a bounding box to potentially detect a row in which grey or black pixels are absent. If such a row is detected, a ratio may be similarly calculated for the white pixels to black pixels. In some implementations, the font feature is calculated for particular characters (e.g., "B", "D", "E", "F", "P", "b", "d", "p" and "q"). Once a value is calculated for each, the values are averaged for representing the feature for the entire font. This feature can be considered size invariant.

Another feature may be used to distinguish black-letter fonts from swashy type fonts and fonts considered normal. Black letter fonts have a property of relatively large curviness, average greyness but lower skew values. Fonts considered normal are generally less curvy and include normal levels of greyness. Swashy fonts are generally considered to have large skew values, large amounts of curviness and average greyness. From these quantities, a feature may be defined as:

isNotBlackLetter=pow(skew/(curv*avggrey),2).

Generally, blackletter fonts have low values and fonts considered normal fonts have average values swashy fonts have higher values. This feature can be considered size invariant as the parameters are size invariant.

Another feature may be used to distinguish hollow fonts from fonts considered normal. In general, hollow fonts have a relatively high number of border pixels while fonts considered normal have a lower border pixel count. As such, the border pixel count may be employed as a feature. This feature can be considered size invariant by multiplying the value by the ratio of a reference font size (e.g., 72 point) and the font size in the taken image.

Along with the font features described above, the font learning machine trainer 306 may use other types of font features with font survey data to train a machine learning system (e.g., a font learning machine 310). Additionally, the determined font features may be processed prior to being used for machine training (or for use by a trained machine to determine font similarity). For example, a vector that represents a collection of font features may be normalized so that training data used can be considered as being placed on an equal basis (and one or more particular font features are not over emphasized). Such normalizing operations may take many forms. For example, the estimated value (e.g., average) and standard deviation (or variance) may be calculated for each feature vector (e.g., by calculating an average and standard deviation of the features included in the vector). Once these quantities are calculated (e.g., the average and standard deviation) each of feature in the vector may be normalized, for example, by using an equation:

$$\text{Normalized Vector Feature Value} = \frac{\text{Vector Feature Value} - \text{Average}}{\text{Standard Deviation}}.$$

As illustrated in FIG. 3, the font learning machine trainer 306 may also provide other types of functionality. For example, the font learning machine trainer 306 may store font features (e.g., calculated feature vectors) in a font feature database 308 for later retrieval and use. Such font feature data may be attained from sources other than the font learning machine trainer 306. For example, the font learning machine 310 may similarly store data representing font features in the font feature database 308. In some arrangements, such font features may be directly provided to the font learning machine trainer 306, the font learning machine 310, etc. and correspondingly stored in the font feature database 308. In other arrangements, calculations may be executed by the font learning machine trainer 306, the font learning machine 310, etc. to produce the font features (prior to being stored in the font feature database 308. For example, numerical values representing one or more font features (e.g., feature vectors) may be computed from graphical representations of font characters (e.g., bitmap images) by the font learning machine trainer 306, the font learning machine 310, etc. Graphical representations may also include outline-based representations such as outlines of scalable fonts (e.g., vector shapes). In some arrangements, combinations of representations may be utilized, for example, bitmap images and outlines of vector shapes may be used in concert. As illustrated in the figure, such stored font feature data may reside in the storage device 216 (in the font feature database 308). Such font feature data may be provided to or received from other locations internal or external to the font service provider 212. For example, the data may be provided for further analysis, storage, etc. to other systems remotely located from the font service provider 212.

In general, the font learning machine trainer 306 may employ one or more techniques to produce the font learning machine 310 (e.g., a neural network). For example, the collected survey information for font pairs and font feature data for each font in the pairs may be used to define a function (e.g., a cost function). By minimizing the function, the font learning machine 310 may be trained. In some arrangements, the same feature types are used for each font included in the font pairs. However, in other arrangements, different types of features for each font may be used for training the font learning machine 310.

Once trained, the font learning machine 310 may be used to determine the similarity between pairs of fonts (not used to train the machine). For example, representations of each font (included in the pair) may be provided to the font learning machine 310. For example, graphical representations (e.g., bitmap images) of the fonts may be input and the font learning machine 310 may calculate a feature vector for each of the fonts. From the calculated feature vectors the font learning machine 310 can calculate the distance between the fonts as a measure of similarity. In some arrangements, a feature vector for each font (included in a font pair) may be calculated external to the font learning machine 310 and provided as input to the machine. In still another arrangement, feature vectors may be compared external to the font learning machine 310 and comparison data may be used as input to the machine for determining the similarity between the fonts included in the pair (e.g., calculate a value that represents the distance between the fonts).

Along with calculating font distance values and other quantities, the font learning machine 310 may provide other types of functionality. For example, along with storing font features (e.g., calculated feature vectors are stored in the font feature database 308), output distance values and other quantities may be stored in a font distance database 312 (e.g., in the storage device 216) for later retrieval and use. In the illustrated arrangement, a font arranger 314 (included in the font service manager 220) may retrieve the calculated distance values for sorting and arranging fonts based on the calculated distances. Along with retrieving font information (e.g., for sorting) from the font distance database 312, the font arranger 314 may also receive font information from other sources. Once sorted and arranged based on the similarities among the fonts, the font arranger 314 may provide other functionality, such as initiating the transmission of information that represents the arranged fonts to one or more computing devices external to the font service provider 212 (e.g., the computer system 202 that requested the arrangement of fonts). The font arranger 314 may also initiate the storage of data that represents the determined font arrangement. As illustrated in the figure, such data may be provided to a font similarity database 316 that resides in the storage device 216. Storing such data generally allows the information to be quickly retrieved rather than being recalculated. For example, for each font residing at the font service provider 212, a list of similar fonts (e.g., the closest one hundred fonts) may be produced and stored for quick retrieval. By caching such information, lists of similar fonts may be quickly attained from the font similarity database 316. Additionally, as newly introduced fonts appear (e.g., are developed and provided to the font service provider 212) operations may be executed to keep the font similarity database 316 updated. Techniques such as batch processing may be implemented for calculating the similarity levels (e.g., distances) between the newly introduced and previously existing fonts. In some situations multiple new fonts may be introduced together and techniques may be employed to efficiently determine similarity levels with preexisting fonts. For example, preexisting fonts may be retrieved one-by-one (from the font feature database 308) and operations executed (by the font learning machine 310) to determine a similarity level with each of the new fonts (e.g., a distance value). By implementing batch processing or other similar techniques, updating of the databases stored at that font service provider 212 may be executed during less busy time periods (e.g., overnight, during weekend hours, etc.). Further, such processing may be prioritized such that more frequently selected fonts are updated before other fonts (e.g., similarity data is updated for frequently selected focus fonts). Introduction of new fonts may also trigger the font learning machine trainer 306 to update (re-educate) the font learning machine 310. In some arrangements, the information residing in the databases 302, 304, 308, 312 and 316 may also be provided to other locations, internal and external to the font service provider 212, to allow for later retrieval and further analysis.

In the illustrated example shown in FIG. 3, the functionality of the font survey collector 300, the font learning machine trainer 306, the font learning machine 310 and the font arranger 314 are presented as being included in the font service manager 220. However, in some arrangements, the functionality of one or more of these modules may be provided external from the font service manager 220. Similarly, the font survey database 302, font database 304, font feature database 308, font distance database 312 and the font similarity database 316 are stored in the storage device 216 in this example. However, one or more of these databases may be stored external to the storage device 216 and in some arrangements one or more of the databases may be stored external to the font service provider 212. In some arrangements, the font service manager 220 may be implemented in software, hardware, or combinations of hardware and software. Similarly the modules included in the font service manager 220 may individually be implemented in hardware and/or software. One or more database techniques (e.g., structural representations, etc.) may be employed for storing the databases 302, 304, 308, 312, 316.

Figure 4:
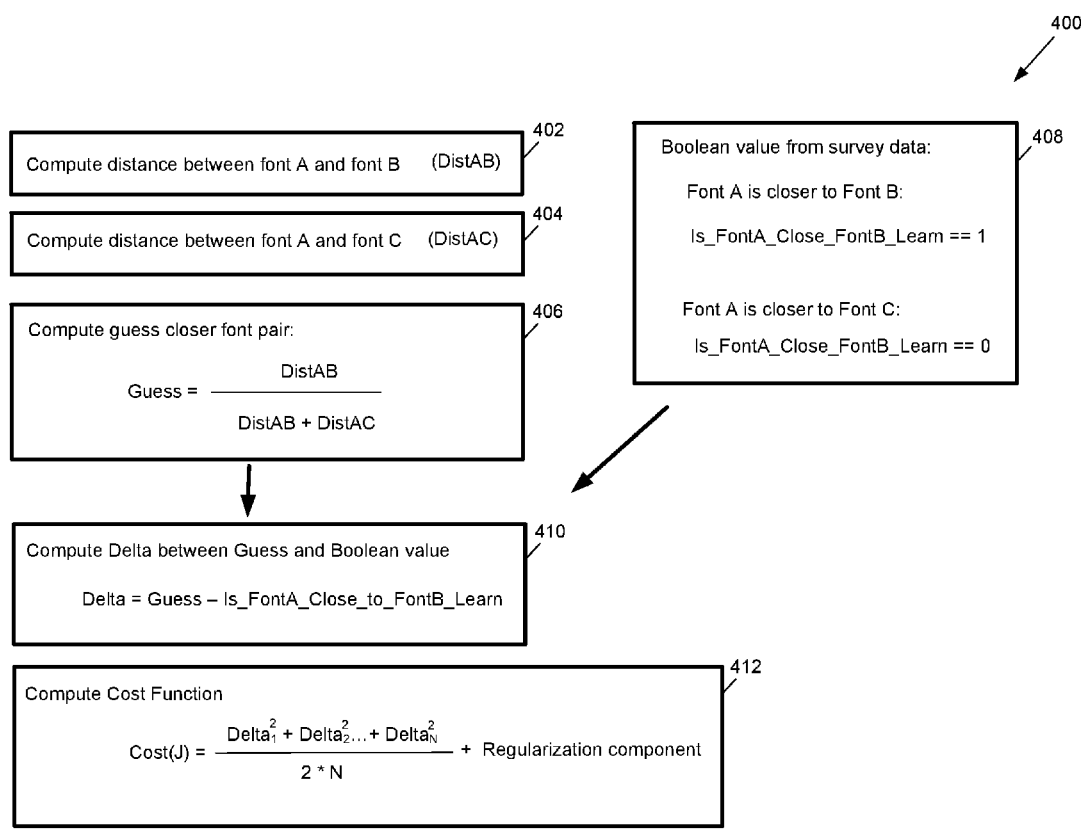
FIG. 4 illustrates operations for training a font learning machine.

Referring to FIG. 4, one or more techniques may be implemented for training a learning machine (e.g., a neural network) to determine a level of similarity between fonts. A dataflow diagram 400 illustrates one potential technique for training such a learning machine. In general, the training employs both font representations and survey data. For the font representations, different types of input data may be used. In one arrangement, each font is represented by one or more feature. For example, the features for each font are represented by a vector of numerical values. Using the illustrated example, one input vector may represent the features of "Font A" while a second input vector may represent the features of "Font B" and a third input vector may represent the features of "Font C". Other types of data may also be input to represent the fonts used for training the learning machine. For example, the calculated differences between feature vectors for two fonts may be input. Still using the illustrated example, the difference between the feature vectors for Font A and Font B may be input along with the difference between the features vectors for Font A and Font C. In still other arrangements, other types of data may be supplied as representing the fonts for training the learning machine. For example, the font learning machine trainer 306 may be capable of calculating feature vectors from font representations (e.g., graphical representations of fonts). As such, a graphical representation of a font (e.g., bitmap image of one more font characters) may be provided and the font learning machine trainer 306 may calculate a feature vector for the font, differences between the calculated feature vector and other vectors, etc.

In the illustrated example, the three fonts, Font A, Font B and Font C, are used to provide the two font pairs (e.g., one pair including Font A and Font B and another pair including Font A and Font C). The pairings were chosen in this example to allow for determining if Font B font of Font C is more similar to Font A. As highlighted by boxes 402 and 404, the learning machine (e.g., a neural network) is initially used to calculate the distance for each font pair and assign a corresponding variable (e.g., the variable "DistAB" represents the distance between font A and font B, and, the variable "DistAC" represents the distance between font A and font C). While one or more techniques may be implemented to calculate the distance for each font pair; typically the quantity is calculated from one or more font features of each font (e.g., a feature vector for Font A, a feature vector for Font B and a feature vector for Font C). Each distance is usually determined by the learning machine is a similar or equivalent manner, however; different techniques may be implemented in some arrangements (e.g., for computation efficiency).

As highlighted in box 406, the calculated distances may be used to calculate a quantity that represents which font pair (of the two) is more similar. For example, the distance between Font A and Font B is divided by the sum of both distances (e.g., the distance between Font A and Font B, plus the distance between Font A and Font C). This quantity (referred to as "Guess") can range in value between 0 and 1. If the value of "Guess" is greater or equal to 0.5, Font B can be considered to be more similar to Font A. If the value is less than 0.5, Font C can be considered to be more similar to Font A. Other techniques may also be implemented for determining which font pair is more similar.

In this arrangement, the computed "Guess" value is used in concert with survey data to potentially improve the similarity determination for the machine learning. As highlighted by box 408, a Boolean value is provided by the survey data that represents whether the survey-takers registered Font B as being more similar to Font A or Font C as being more similar to Font A. In this particular arrangement, a Boolean value of 1 represents that the survey data reports that Font B is considered to be more similar to Font A, and a Boolean value of 0 represents that Font C is considered to more similar to Font A. A variable (labeled "Is_FontA_Close_FontB_Learn") is assigned this value (e.g., 1 or 0) to allow processing with the distance-based data. As highlighted by the box 410, one potential process determines the difference between the computed similarity determination (e.g., the "Guess" variable) and the Boolean value (e.g., numerical value 1 or 0) that represents the font similarity. In this arrangement, a variable (e.g., referred to as "Delta") is assigned the value of the difference of the quantities. In general, the value of Delta may range from −1 to +1, and a value of 0 can be considered as an indication that the font pair determined to be similar from the calculated distances matches the same font pair provided by the survey data. The box 410 demonstrates that a Boolean value representing survey results is used directly with the distance-based data. As such, a second set of distance calculations are not computed from the survey results and are not used with the variables "DistAB" and "DistAC". Rather the Boolean value is compared to a quantity (the variable Guess) that represents a comparison of the distance (and ranges between 0 and 1). By using the Boolean values and executing distance calculations once for the font pairs, computational efficiency can be improved.

One or more techniques may be implemented for training a machine learning system from the data calculated from the font pairs and survey data. For example, the learning machine (e.g., the font learning machine 310) such as a neural network may be trained by defining a cost function from the calculated data. In general, the cost function can be considered as providing a measure of a solution compared to an optimal solution. For machine learning that employs supervised learning, a cost function can be considered to assist with mapping (e.g., by minimizing error) between an output and a target. Implementing unsupervised learning, a cost function can be defined (e.g., as a function of data) and minimized to provide an output value. Techniques involved in the training of artificial neural networks may also employ techniques that involve cost functions. For example, a cost function may be processed (e.g., compute a derivative) with respect to parameters of the function to determine output values. Highlighted in box 412, a cost function is defined in which a number of Deltas for different font pairs (i.e., N pairs) are squared and summed. This quantity is divided by twice the number of font pairs (e.g., 2N). Additionally, in this example a regularization component is added to the cost function to counteract over-fitting by the function. To assist with the machine learning, the costs function provides a cost along with a derivative. In general, the machine learning can be considered as being over-constrained since the output is driven to a value of 0 and 1 and a zero cost solution is not understood to exist.

Typically a series of training cycles are executed to prepare a machine learning system (e.g., the font learning machine 310 shown in FIG. 3). Once training is complete, the system may be used for determining distances between other font pairs (e.g., pairs of fonts not used for training the system). To use such a trained system one or more different types of inputs may be utilized. For example, one or more numerical values may be provided that represent corresponding features of a font. In one arrangement, a vector of numerical values that represent the font features may be input. Some machine learning systems may be capable of calculating one or more features (e.g., numerical values) for representing fonts. For such systems input data may simply represent one or more characters of the font. For example, a graphical image of each font character (e.g. a bitmap image) may be provided as input to the system which in turn calculates a vector of font features. Provided the input data, the machine learning system (e.g., the font learning machine 310) may output a distance that represents a level of similarity of the input font pair.

Other types of input may also represent a font, for example, an outline-based representation may be provided to a machine learning system (e.g., for feature production). Such representations may include scalable representations (e.g., similar to a TrueType font). Along with providing representations for using a machine learning system, such representations may also be used to train machine learning systems. In some instances, combinations of imagery (e.g., a bitmap image) and outline representations may be used for training and/or using a machine learning system. Files, formats, data structures, etc. similarly be input for training/using a machine learning system. For example, a file containing font information (e.g., an ".otf" file) may be input and one or more images (e.g., bitmap images) may be produced (from the font information stored in the file) and employed to train and/or use a machine learning system.

One or more techniques may be implemented for image production, for example, an image renderer (e.g., a rendering module, rendering engine, etc.) may be included in the font learning machine trainer 310, the font learning machine trainer 306, etc. Once produced, the one or more images (e.g., a bitmap image) may be used (e.g., by the font learning machine 310, the font learning machine trainer 306, etc.) to determine features for the represented font or fonts. Once determined, the feature space provided by the font features (e.g., represented in a vector for each font) may be used for training and/or learning machine use.

Referring to FIGS. 5-7, a script of instructions is presented that may be executed to train a neural network as graphically depicted in FIG. 4. The script instructions are based upon a matrix-based numerical computing environment referred to as MATLAB, developed by MathWorks of Natick, Mass. As presented in section 500 (shown in FIG. 5), comments are provided that describe the neural network and related components. Section 502 (also shown in FIG. 5) defines some variables along with functions for the neural network. Additionally, section 502 includes operations for determining the estimated distance between Font A and Font B. Section 600 (shown in FIG. 6) includes instructions for determining the estimated distance between Font A and Font C along with operations for computing the quantity "Guess" (shown in FIG. 4) that represents if font B or Font C is more similar to Font A. Section 602 provides additional processing operations regarding the delta variable and computing the cost function. Section 700 (shown in FIG. 7) includes instructions for defining variables associated with gradient for both font pairs and section 702 includes instructions associated with adding a regularization term to the cost function to reduce the effects of over-fitting. However, the regularization term is not applied to the bias terms.

Figure 8:
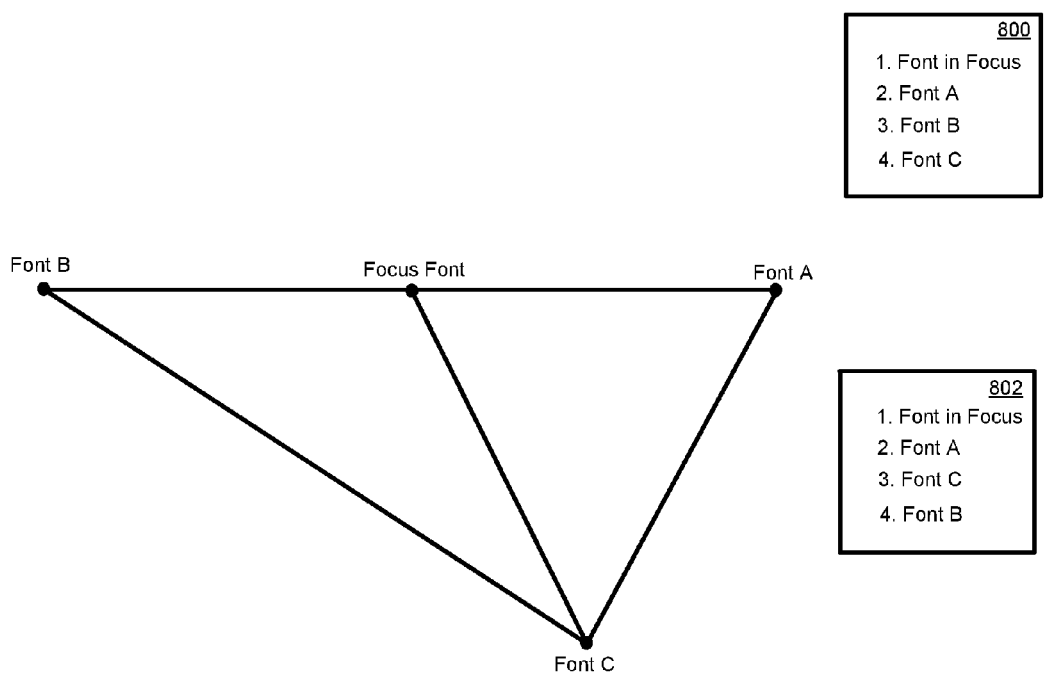
FIG. 8 illustrates distances between fonts and ordered lists of fonts.

Referring to FIG. 8, through the training of the machine learning system (e.g., the font learning machine 310 shown in FIG. 3), data representing other pairs of fonts may be input to determine the distance between the individual fonts. In some instances, one or both of the fonts in these newly input pairs may be presented for the first time to the neural network. As such, along with determining the distances between the fonts, additional teaching may be achieved through machine learning. Once computed (e.g., by the neural network), the distances for the font pairs may be stored for later retrieval and use (e.g., for presenting fonts that are similar to a focus font as illustrated in FIG. 1). One or more techniques may be implemented for presenting the fonts based on similarity. For example, the fonts may be sorted based on their distance to the focus font. The font listed directly below the focus font may be the font associated with the smallest distance. Next, the font with the second smallest distance may be listed. In some arrangements, rather than listing each and every font based on its distance to the focus font, windowing techniques may be implemented to reduce the number of fonts presented as being similar to the font in focus. For example, a fixed number of fonts may be presented for each instance when a focus font is selected.

The ordering of the similar fonts may also not be solely based on the calculated distance between each font and the focus font. For example, the sorting of the fonts may be partially based upon the calculated distance between the focus font and each of the other fonts (e.g., 90% of ordering may depend upon this distance) and one or more other factors. One factor may be the distance between other fonts (e.g., the distance between font pairs that do not include the focus font). The figure graphically represents distance between pairings of four fonts (labeled "Focus Font", "Font A", "Font B" and "Font C"). As illustrated, one list of fonts may be produced that is solely based on the calculated distance between each individual font and the Focus Font. In this example, the distance between the Focus Font and Font A is the shortest, followed by the distance between the Focus Font and Font B. The longest distance from the Focus Font is the distance to Font C. As represented by the list 800, the ordering of the fonts is based solely on the distance between the Focus Font and each of the other fonts, ranging from shortest distance to longest distance. In this example, the list 800 starts with the Focus Font (in position 1) and follows with Font A, Font B and Font C based on the distances of each to the Focus Font. Another list 802 is also presented in the figure in which the distances between Fonts A, B and C are also used for determining order. Similar to list 800, the Focus Font and Font A reside in the first and second positions (since Font A is closest in distance to the Focus Font). Font C resides in the third position of list 802 since the distance between Font A and Font C is shorter than the distance between Font B and Font A. Font B resides in the fourth position of the list 802 based on the distance to Font C. As such, the list 802 takes into account the distance between the fonts that exclude the focus font. This technique can be considered as attempting to minimize the distance traveled from one font to the next (starting from the Focus Font).

In some arrangements, combinations of techniques may be implemented when determining the font order for a list. For example, the distance between the focus font and each of the other fonts may be used in combination with the distances between each font pair. Weighting may also be used in such combinations. For example, the distance between the focus font and each of the other fonts may be heavily weighted (e.g., a 90% weight applied) while a less weight (e.g., a 10% weight) may be applied to the distances between the font pairs that don't include the focus font. Referring to FIGS. 9, 10 and 11, a script of Java instructions is presented (in respective sections 900, 1000, and 1100) that implement such a combination to produce an ordered list of fonts. In still another example, one or more rules may be assigned to particular list entries. For example, along with always having the focus font appearing in the first list entry, the font with the largest distance to the focus font may always be assigned to the last list entry. Through such rules, a viewer may be provided a font list that appears logical and tends to group the more similar fonts, thereby providing a more natural look to the list. As such, similar fonts generally won't appear so separated as to possibly confuse a viewer as they navigate the fonts for one or more selections.

Figure 12:
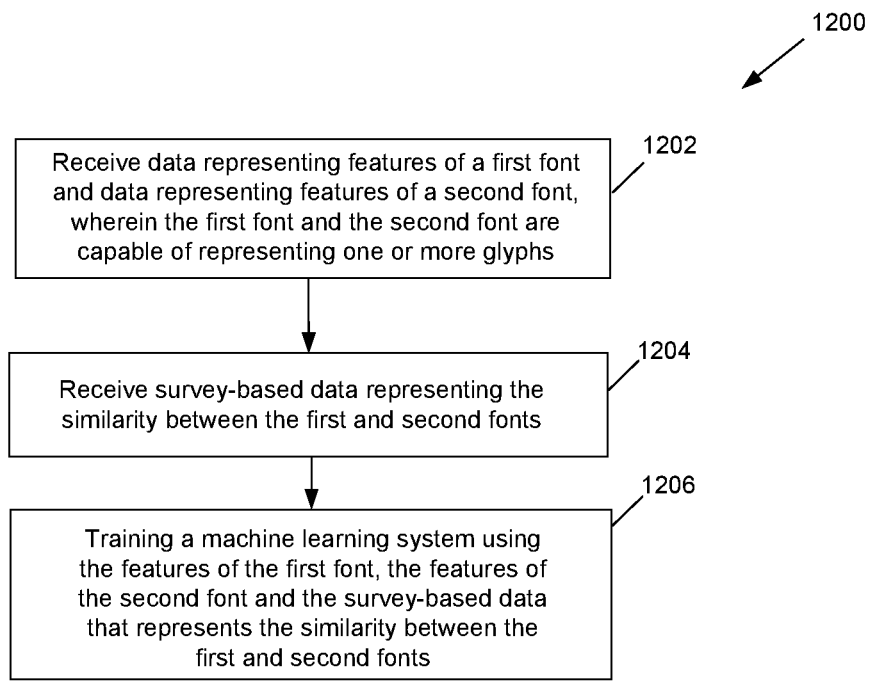
FIG. 12 is an example flow chart of font service manager operations.

Referring to FIG. 12, a flowchart 1200 represents operations of a font service manager (e.g., the font service manager 220 shown in FIG. 3). Operations of the font service manager 220 are typically executed by a single computing device (e.g., the server 218); however, operations of the font service manager may be executed by multiple computing devices. Along with being executed at a single site (e.g., the font service provider 212), the execution of operations may be distributed among two or more locations.

Operations of the font service provider may include receiving 1202 receiving data representing features of a first font and data representing features of a second font. The first font and the second font are capable of representing one or more glyphs. For example, data representing features (e.g., skewness, a stroke width ratio, etc.) may be received for two fonts (or multiple pairs of fonts) being used for training a machine learning system such as the font learning machine 310 (shown in FIG. 3). In some arrangements the features for each font may be represented as a vector of font features. Each vector may include numerical values that represent the features (e.g., font curviness, center of gravity, etc.) of the corresponding font. Operations may also include 1204 receiving survey-based data representing the similarity between the first and second fonts. For example, survey data may be provided in the form of responses to a survey that include a large number of questions (e.g., 50,000 or 100,000 questions) in which a survey-taker is asked to indicate if Font B or Font C is more similar to Font A. Operations may also include training 1206 a machine learning system using the features of the first font, the features of the second font and the survey-based data that represents the similarity between the first and second fonts. For example, a level of similarity may be calculated from the features of the first and second fonts (e.g., a distance value) and then compared to the survey-based similarity (as highlighted by the box 410 in FIG. 4). A neural network or other type of machine learning system may be trained with a cost function such that a level of similarity may be accurately estimated between a font pair not previously introduced (e.g., not used to train the machine learning system) or for a font pair in which one of the fonts was previously used for training the machine learning system.

Figure 13:
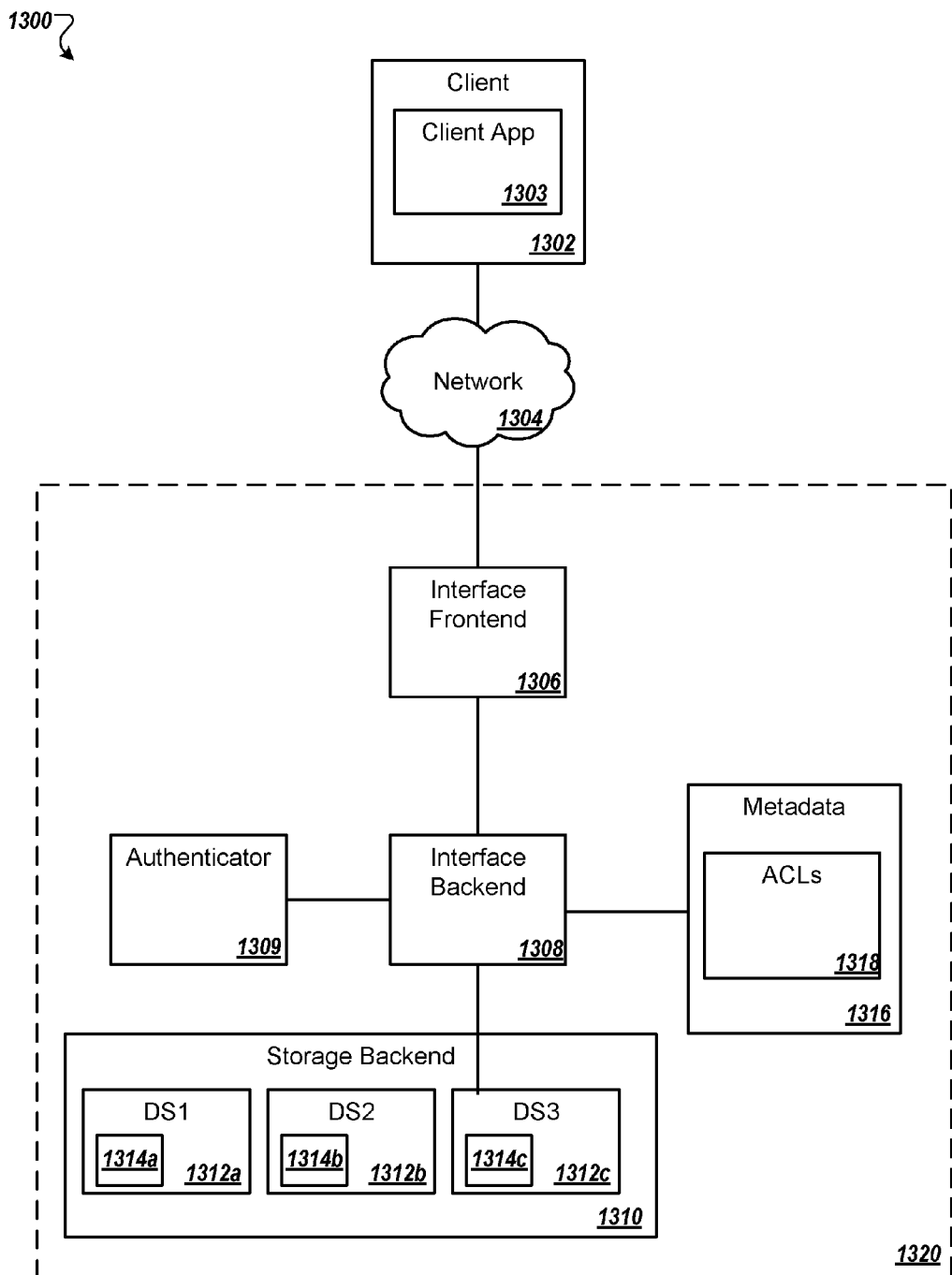
FIG. 13 is a block diagram showing an example of a system that provides hosted storage and accesses the hosted storage from a client device.

FIG. 13 is a block diagram showing an example of a system 1300 for providing hosted storage and accessing the hosted storage from a client device 1302 (e.g., a computing device). In some implementations, a hosted storage service 1320 may provide access to data (e.g., font information, lists of fonts, font similarity data, etc.) stored by applications (e.g., web browsers) running on computing devices operating separately from one another, provide offsite data backup and restore functionality, provide data storage to a computing device with limited storage capabilities, and/or provide storage functionality not implemented on a computing device.

The system 1300 may provide scalable stores for storing data resources. The client device 1302 may upload data resources to the hosted storage service 1320 and control access to the uploaded data resources. Access control may include a range of sharing levels (e.g., private, shared with one or more individuals, shared with one or more groups, public, etc.). Data stored in hosted storage service 1320 can be secured from unauthorized access. The hosted storage service 1320 can use a simple and consistent application programming interface, or API, which can allow arbitrary quantities of structured or unstructured data to be kept private or shared between individuals, organizations, or with the world at large. The client device 1302 may access, retrieve, be provided, store, etc. data in the hosted storage service 1320 for any number of a variety of reasons. For example, data may be stored for business reasons (e.g., provide identification information to attain access clearance for font data at the hosted storage service 1320), or for use in data processing by other services.

Figure 14:
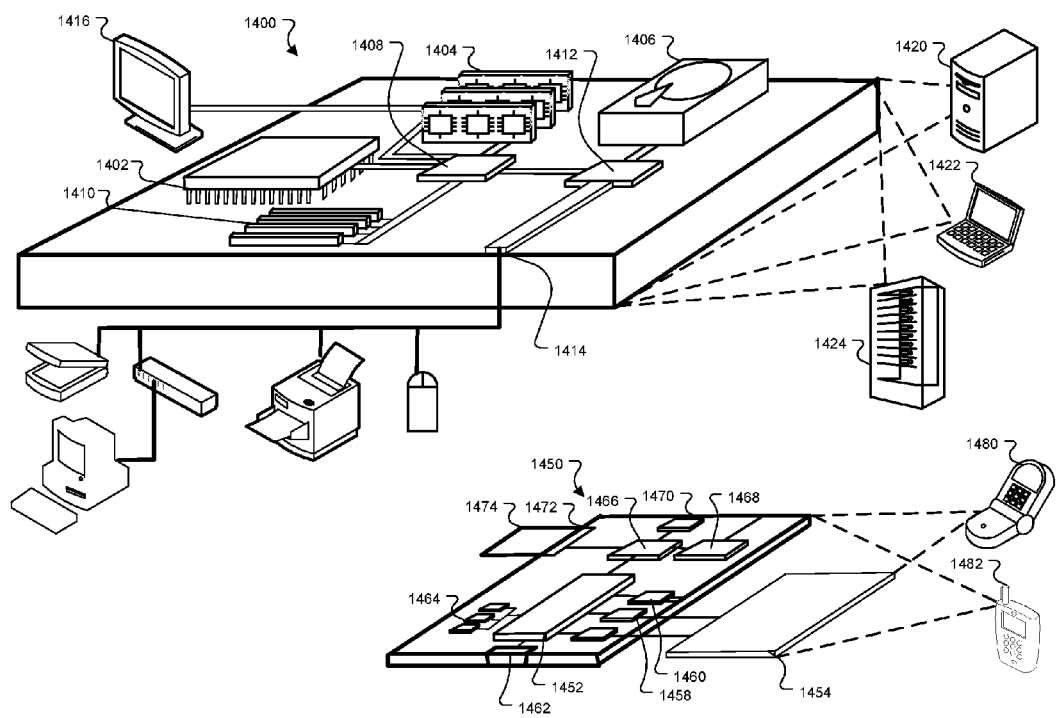
FIG. 14 illustrates an example of a computing device and a mobile computing device that can be used to implement the techniques described here.

The client device 1302 may be implemented using a computing device, such as the computing device 1400 or the mobile device 1450 described with respect to FIG. 14. The client device 1302 may communicate with the hosted storage service 1320 via a network 1304, such as the Internet. The client device 1302 may communicate across the network using communication protocols such as one or more of Transmission Control Protocol/Internet Protocol (TCP/IP), Hypertext Transfer Protocol (HTTP), Secure Shell Remote Protocol (SSH), or Application Program Interfaces (API). Electronic mail (e-mail) protocols may also be utilized. For example, one or more e-mail protocols may be used for providing assets (e.g., electronic documents, etc.) to an imaging device (e.g., a printer) from the hosted storage service 1320, a computing device such as the computing device 1400 or the mobile device 1450, etc. While only a single client device 1302 is shown, there may be multiple client devices communicating across the network 1304 with the hosted storage service 1320 and/or other services and devices.

The hosted storage service 1320 may be implemented such that client applications executed on client device 1302, such as a client application 1303, may store, retrieve, or otherwise manipulate data resources in the hosted storage service 1320. The hosted storage service 1320 may be implemented by one or more server devices, which may be implemented using a computing device, such as the computing device 1400 or mobile device 1450 described with respect to FIG. 14. For example, the hosted storage service 1320 may be implemented by multiple server devices operating in the same, or different, data centers.

The hosted storage service 1320 generally includes an interface frontend 1306, an interface backend 1308, a storage backend 1310, and metadata 1316 for resources stored in the storage backend 1310. The hosted storage service 1320 may also include an authenticator 1309 to verify that a user requesting one or more fonts should be provided access to the fonts (e.g., based on a service subscription, rental period, etc.).

In general, the interface frontend 1306 may receive requests from and send responses to the client device 1302. For instance, the hosted storage service 1320 may be implemented as a Web Service with a corresponding set of Web Service Application Programming Interfaces (APIs). The Web Service APIs may be implemented, for example, as a Representational State Transfer (REST)-based HTTP interface or a Simple Object Access Protocol (SOAP)-based interface. Interface frontend 1306 may receive messages from the client 1302 and parse the requests into a format usable by the hosted storage service 1320, such as a remote procedure call (RPC) to an interface backend 1308. The interface frontend 1306 may write responses generated by the hosted storage service 1320 for transmission to the client 1302. In some implementations, multiple interface frontends 1306 may be implemented to support multiple access protocols, for example.

The interface frontend 1306 may include a graphical frontend, for example to display on a web browser for data access. The interface frontend 1306 may include a subsystem to enable managed uploads and downloads of large files (e.g., for functionality such as pause, resume, and recover from time-out). The interface frontend 1306 may monitor load information and update logs, for example to track and protect against denial of service (DOS) attacks.

As described above, the Web Service API may be a REST-based HTTP interface. In a REST-based interface, a data resource is accessed as a resource, uniquely named using a uniform resource identifier (URI), and the client application 1303 and service 1320 exchange representations of resource state using a defined set of operations. For example, requested actions may be represented as verbs, such as by HTTP GET, PUT, POST, HEAD, and DELETE verbs. The GET verb may be used to retrieve a resource, while the HEAD verb may be used to retrieve information about a resource without retrieving the resource itself. The DELETE verb may be used to delete a resource from the hosted storage service 1320. The PUT and POST verbs may be used to upload a resource to the service 1320. PUT requests may come from the client 1302 and contain authentication and authorization credentials and resource metadata in a header, such as an HTTP header. POST requests may be received when a client 1302 wants to upload from a web browser form. The form POST upload protocol for the hosted storage service 1320 may involve multiple form fields to provide authentication, authorization, and resource metadata. More generally, any of the API requests may include credentials for authentication and authorization, for example in a header of the request. An authorization header may be included in the REST requests, which may include an access key to identify the entity sending the request.

Alternatively, or additionally, a user may be authenticated based on credentials stored in a browser cookie, which may be appended to the API requests. If no valid cookie is present, a redirect to an authentication frontend may be generated, and the authentication frontend may be used to generate the browser cookie. The authentication frontend may be used by systems and services in addition to the hosted storage service 1320 (e.g., if the organization operating the hosted storage service 1320 also operates other web services such as email service). A user may also or alternatively be authenticated based on authentication credentials from an external credentialing service or an external service that includes credentialing functionality. User or group identifier information may be calculated from the external service's credential information. Requests sent by the client 1302 to the interface frontend 1306 may be translated and forwarded to the external service for authentication.

In general, resources stored in the hosted storage service 1320 may be referenced by resource identifiers. The hosted storage service 1320 may define namespaces to which a valid resource identifier must conform. For example, the namespace may require that resource identifiers be a sequence of Unicode characters whose UTF-8 encoding is at most 1024 bytes long. As another example, the namespace may require that resource identifiers be globally unique identifiers (GUIDs), which may be 128-bit integers.

Resources (e.g., objects such as font data) may be stored in hosted storage service 1320 in buckets. In some examples, each bucket is uniquely named in the hosted storage service 1320, each data resource is uniquely named in a bucket, and every bucket and data resource combination is unique. Data resources may be uniquely identified by a URI that includes the bucket name and the resource name, and identifies the hosted storage service 1320. For example, a resource named "/frutiger.fnt" in a bucket named "fonts" could be specified using a URI pattern such as http://s.hostedstorage-system.com/fonts/frutiger.fnt or http://fonts.s.hostedstoragesystem.com/frutiger.fnt. Alternatively, the user of the client 1302 may create a bucket named my.fonts.org, publish a CNAME alias redirected to http://fonts.s.hostedstoragesystem.com, and address the resource as http://my.fonts.org/frutiger.fnt. In some examples, buckets do not nest.

The interface backend 1308 along with the authenticator 1309 may handle request authentication and authorization, manage data and metadata, and track activity, such as for billing. As one example, the interface backend 1308 may query the authenticator 1309 when a request for one or more fonts is received. The interface backend 1308 may also provide additional or alternative functionality. For example, the interface backend 1308 may provide functionality for independent frontend/backend scaling for resource utilization and responsiveness under localized heavy loads. Data management may be encapsulated in the interface backend 1308 while communication serving may be encapsulated in the interface frontend 1306. The interface backend 1308 may isolate certain security mechanisms from the client-facing interface frontend 1306.

The interface backend 1308 may expose an interface usable by both the interface frontend 1306 and other systems. In some examples, some features of the interface backend 1308 are accessible only by an interface frontend (not shown) used by the owners of the hosted storage service 1320 (internal users). Such features may include those needed for administrative tasks (e.g., resolving a resource reference to a low level disk address). The interface backend 1308 may handle request authentication (e.g., ensuring a user's credentials are valid) and authorization (e.g., verifying that a requested operation is permitted). The interface backend may also provide encryption and decryption services to prevent unauthorized access to data, even by internal users.

The interface backend 1308 may manage metadata 1316 associated with data resources, for example in a MySQL database or BigTable. User-specified names that label the buckets can be completely defined within the metadata 1316, and resource metadata 1316 can map a resource name to one or more datastores 1312 storing the resource. The metadata 1316 can also contain bucket and resource creation times, resource sizes, hashes, and access control lists 1318 (ACL 1318) for both buckets and resources. The interface backend 1308 can log activity and track storage consumption to support accounting for billing and chargebacks. In some examples, this includes quota monitoring in each dimension in which customers are charged (e.g., reads, writes, network transfers, total storage in use).

The ACLs 1318 may generally define who is authorized to perform actions on corresponding buckets or resources, and the nature of the permitted actions. The ACLs 1318 may be an unordered list of {scope, role} pairs, plus Boolean flags. The scope may define a user or group of users and the role may define the access permissions for the user or group. In some examples, the union of all {scope, role} pairs may define access rights. In some examples, more specific {scope, role} pairs override more general ones.

The storage backend 1310 may contain multiple datastores 1312a-1312c. Although three datastores 1312 are shown, more or fewer are possible. Each of the datastores 1312a-1312c may store data resources 1314a-1314c in a particular format. For example, data store 1312a may store a data resource 1314a as a Binary Large Object (BLOB), data store 1312b may store a data resource 1314b in a distributed file system (e.g., Network File System), and data store 1312c may store a data resource 1314c in a database (e.g., MySQL).

FIG. 14 shows an example of example computer device 1400 and example mobile computer device 1450, which can be used to implement the techniques described herein. For example, a portion or all of the operations of the font service manager 220 (shown in FIG. 3) or the software agent 206 (shown in FIG. 2) may be executed by the computer device 1400 and/or the mobile computer device 1450. Computing device 1400 is intended to represent various forms of digital computers, including, e.g., laptops, desktops, workstations, personal digital assistants, servers, blade servers, mainframes, and other appropriate computers. Computing device 1450 is intended to represent various forms of mobile devices, including, e.g., personal digital assistants, tablet computing devices, cellular telephones, smartphones, and other similar computing devices. The components shown here, their connections and relationships, and their functions, are meant to be examples only, and are not meant to limit implementations of the techniques described and/or claimed in this document.

Computing device 1400 includes processor 1402, memory 1404, storage device 1406, high-speed interface 1408 connecting to memory 1404 and high-speed expansion ports 1410, and low speed interface 1412 connecting to low speed bus 1414 and storage device 1406. Each of components 1402, 1404, 1406, 1408, 1410, and 1412, are interconnected using various busses, and can be mounted on a common motherboard or in other manners as appropriate. Processor 1402 can process instructions for execution within computing device 1400, including instructions stored in memory 1404 or on storage device 1406 to display graphical data for a GUI on an external input/output device, including, e.g., display 1416 coupled to high speed interface 1408. In other implementations, multiple processors and/or multiple busses can be used, as appropriate, along with multiple memories and types of memory. Also, multiple computing devices 1400 can be connected, with each device providing portions of the necessary operations (e.g., as a server bank, a group of blade servers, or a multi-processor system).

Memory 1404 stores data within computing device 1400. In one implementation, memory 1404 is a volatile memory unit or units. In another implementation, memory 1404 is a non-volatile memory unit or units. Memory 1404 also can be another form of computer-readable medium (e.g., a magnetic or optical disk. Memory 1404 may be non-transitory.)

Storage device 1406 is capable of providing mass storage for computing device 1400. In one implementation, storage device 1406 can be or contain a computer-readable medium (e.g., a floppy disk device, a hard disk device, an optical disk device, or a tape device, a flash memory or other similar solid state memory device, or an array of devices, such as devices in a storage area network or other configurations.) A computer program product can be tangibly embodied in a data carrier. The computer program product also can contain instructions that, when executed, perform one or more methods (e.g., those described above.) The data carrier is a computer- or machine-readable medium, (e.g., memory 1404, storage device 1406, memory on processor 1402, and the like.)

High-speed controller 1408 manages bandwidth-intensive operations for computing device 1400, while low speed controller 1412 manages lower bandwidth-intensive operations. Such allocation of functions is an example only. In one implementation, high-speed controller 1408 is coupled to memory 1404, display 1416 (e.g., through a graphics processor or accelerator), and to high-speed expansion ports 1410, which can accept various expansion cards (not shown). In the implementation, low-speed controller 1412 is coupled to storage device 1406 and low-speed expansion port 1414. The low-speed expansion port, which can include various communication ports (e.g., USB, Bluetooth®, Ethernet, wireless Ethernet), can be coupled to one or more input/output devices, (e.g., a keyboard, a pointing device, a scanner, or a networking device including a switch or router, e.g., through a network adapter.)

Computing device 1400 can be implemented in a number of different forms, as shown in the figure. For example, it can be implemented as standard server 1420, or multiple times in a group of such servers. It also can be implemented as part of rack server system 1424. In addition or as an alternative, it can be implemented in a personal computer (e.g., laptop computer 1422.) In some examples, components from computing device 1400 can be combined with other components in a mobile device (not shown), e.g., device 1450. Each of such devices can contain one or more of computing device 1400, 1450, and an entire system can be made up of multiple computing devices 1400, 1450 communicating with each other.

Computing device 1450 includes processor 1452, memory 1464, an input/output device (e.g., display 1454, communication interface 1466, and transceiver 1468) among other components. Device 1450 also can be provided with a storage device, (e.g., a microdrive or other device) to provide additional storage. Each of components 1450, 1452, 1464, 1454, 1466, and 1468, are interconnected using various buses, and several of the components can be mounted on a common motherboard or in other manners as appropriate.

Processor 1452 can execute instructions within computing device 1450, including instructions stored in memory 1464. The processor can be implemented as a chipset of chips that include separate and multiple analog and digital processors. The processor can provide, for example, for coordination of the other components of device 1450, e.g., control of user interfaces, applications run by device 1450, and wireless communication by device 1450.

Processor 1452 can communicate with a user through control interface 1458 and display interface 1456 coupled to display 1454. Display 1454 can be, for example, a TFT LCD (Thin-Film-Transistor Liquid Crystal Display) or an OLED (Organic Light Emitting Diode) display, or other appropriate display technology. Display interface 1456 can comprise appropriate circuitry for driving display 1454 to present graphical and other data to a user. Control interface 1458 can receive commands from a user and convert them for submission to processor 1452. In addition, external interface 1462 can communicate with processor 1442, so as to enable near area communication of device 1450 with other devices. External interface 1462 can provide, for example, for wired communication in some implementations, or for wireless communication in other implementations, and multiple interfaces also can be used.

Memory 1464 stores data within computing device 1450. Memory 1464 can be implemented as one or more of a computer-readable medium or media, a volatile memory unit or units, or a non-volatile memory unit or units. Expansion memory 1474 also can be provided and connected to device 1450 through expansion interface 1472, which can include, for example, a SIMM (Single In Line Memory Module) card interface. Such expansion memory 1474 can provide extra storage space for device 1450, or also can store applications or other data for device 1450. Specifically, expansion memory 1474 can include instructions to carry out or supplement the processes described above, and can include secure data also. Thus, for example, expansion memory 1474 can be provided as a security module for device 1450, and can be programmed with instructions that permit secure use of device 1450. In addition, secure applications can be provided through the SIMM cards, along with additional data, (e.g., placing identifying data on the SIMM card in a non-hackable manner.)

The memory can include, for example, flash memory and/or NVRAM memory, as discussed below. In one implementation, a computer program product is tangibly embodied in a data carrier. The computer program product contains instructions that, when executed, perform one or more methods, e.g., those described above. The data carrier is a computer- or machine-readable medium (e.g., memory 1464, expansion memory 1474, and/or memory on processor 1452), which can be received, for example, over transceiver 1468 or external interface 1462.

Device 1450 can communicate wirelessly through communication interface 1466, which can include digital signal processing circuitry where necessary. Communication interface 1466 can provide for communications under various modes or protocols (e.g., GSM voice calls, SMS, EMS, or MMS messaging, CDMA, TDMA, PDC, WCDMA, CDMA2000, or GPRS, among others.) Such communication can occur, for example, through radio-frequency transceiver 1468. In addition, short-range communication can occur, e.g., using a Bluetooth®, WiFi, or other such transceiver (not shown). In addition, GPS (Global Positioning System) receiver module 1470 can provide additional navigation- and location-related wireless data to device 1450, which can be used as appropriate by applications running on device 1450. Sensors and modules such as cameras, microphones, compasses, accelerators (for orientation sensing), etc. may be included in the device.

Device 1450 also can communicate audibly using audio codec 1460, which can receive spoken data from a user and convert it to usable digital data. Audio codec 1460 can likewise generate audible sound for a user, (e.g., through a speaker in a handset of device 1450.) Such sound can include sound from voice telephone calls, can include recorded sound (e.g., voice messages, music files, and the like) and also can include sound generated by applications operating on device 1450.

Computing device 1450 can be implemented in a number of different forms, as shown in the figure. For example, it can be implemented as cellular telephone 1480. It also can be implemented as part of smartphone 1482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor. The programmable processor can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a device for displaying data to the user (e.g., a CRT (cathode ray tube) or LCD (liquid crystal display) monitor), and a keyboard and a pointing device (e.g., a mouse or a trackball) by which the user can provide input to the computer. Other kinds of devices can be used to provide for interaction with a user as well; for example, feedback provided to the user can be a form of sensory feedback (e.g., visual feedback, auditory feedback, or tactile feedback); and input from the user can be received in a form, including acoustic, speech, or tactile input.

The systems and techniques described here can be implemented in a computing system that includes a backend component (e.g., as a data server), or that includes a middleware component (e.g., an application server), or that includes a frontend component (e.g., a client computer having a user interface or a Web browser through which a user can interact with an implementation of the systems and techniques described here), or a combination of such back end, middleware, or frontend components. The components of the system can be interconnected by a form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the engines described herein can be separated, combined or incorporated into a single or combined engine. The engines depicted in the figures are not intended to limit the systems described here to the software architectures shown in the figures.

A number of embodiments have been described. Nevertheless, it will be understood that various modifications can be made without departing from the spirit and scope of the processes and techniques described herein. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

What is claimed is:

1. A computing device implemented method comprising:
   receiving data representing a pair of fonts, wherein each font of the pair of fonts is capable of representing one or more glyphs;
   determining a level a similarity for the pair of fonts using a machine learning system, the machine learning system being trained using a difference between features of a first font and features of a second font, and using data representing similarity between the first and second fonts as determined by one or more individuals; and
   producing a list of fonts for presentation based on the level of similarity for the font pair, wherein a presented order of fonts in the produced list is based upon a level of similarity between a focus font and other fonts.

2. The computing device implemented method of claim 1, the machine learning system being trained by calculating a cost function from the difference between the features of the first font and the features of the second font, and from the data that represents the similarity between the first and second fonts as determined by one or more individuals.

3. The computing device implemented method of claim 2, wherein training the machine learning system includes minimizing the cost function.

4. The computing device implemented method of claim 1, wherein the data representing similarity between the first and second fonts as determined by one or more individuals includes survey-based data.

5. The computing device implemented method of claim 1, wherein training the machine learning system includes calculating a level of similarity between the first font and the second font from the first font features and the second font features.

6. The computing device implemented method of claim 5, wherein calculating the level of similarity includes determining the difference between features of the first font and corresponding features of the second font.

7. The computing device implemented method of claim 5, wherein training the machine learning system includes comparing the calculated level of similarity between the first and second fonts and a value that represents the similarity between the first and second fonts.

8. The computing device implemented method of claim 1, wherein the machine learning system implements a neural network.

9. The computing device implemented method of claim 1, wherein the pair of fonts used by the machine learning system to determine the level of similarity do not include training fonts.

10. The computing device implemented method of claim 1, wherein the focus font is user selected.

11. The computing device implemented method of claim 1, wherein the presented order of the fonts accounts for a level of similarity between each pair of fonts adjacently positioned on the produced list.

12. The computing device implemented method of claim 1, wherein the features of a first font are produced from one or more bitmap images rendered by the machine learning system.

13. A system comprising:
a computing device comprising:
a memory configured to store instructions; and
a processor to execute the instructions to perform operations comprising:
receiving data representing a pair of fonts, wherein each font of the pair of fonts is capable of representing one or more glyphs;
determining a level a similarity for a pair of fonts using a machine learning system, the machine learning system being trained using features of a first font and features of a second font, and using data representing similarity between the first and second fonts as determined by one or more individuals; and
producing a list of fonts for presentation based on the level of similarity for the font pair, wherein a presented order of fonts in the produced list is based upon a level of similarity between a focus font and other fonts.

14. The system of claim 13, the machine learning system being trained by calculating a cost function from the difference between the features of the first font and the features of the second font, and from the data that represents the similarity between the first and second fonts as determined by one or more individuals.

15. The system of claim 14, wherein training the machine learning system includes minimizing the cost function.

16. The system of claim 13, wherein the data representing similarity between the first and second fonts as determined by one or more individuals includes survey-based data.

17. The system of claim 13, wherein training the machine learning system includes calculating a level of similarity between the first font and the second font from the first font features and the second font features.

18. The system of claim 17, wherein calculating the level of similarity includes determining the difference between features of the first font and corresponding features of the second font.

19. The system of claim 17, wherein training the machine learning system includes comparing the calculated level of similarity between the first and second fonts and a value that represents the similarity between the first and second fonts.

20. The system of claim 13, wherein the machine learning system implements a neural network.

21. The system of claim 13, wherein the pair of fonts used by the machine learning system to determine the level of similarity do not include training fonts.

22. The system of claim 13, wherein the focus font is user selected.

23. The system of claim 13, wherein the presented order of the fonts accounts for a level of similarity between each pair of fonts adjacently positioned on the produced list.

24. The system of claim 13, wherein the features of a first font are produced from one or more bitmap images rendered by the machine learning system.

25. One or more non-transitory computer readable media storing instructions that are executable by a processing device, and upon such execution cause the processing device to perform operations comprising:
receiving data representing a pair of fonts, wherein each font of the pair of fonts is capable of representing one or more glyphs;
determining a level a similarity for a pair of fonts using a machine learning system, the machine learning system being trained using a difference between features of a first font and features of a second font, and using data representing similarity between the first and second fonts as determined by one or more individuals; and
producing a list of fonts for presentation based on the level of similarity for the font pair, wherein a presented order of fonts in the produced list is based upon a level of similarity between a focus font and other fonts.

26. The non-transitory computer readable media of claim 25, the machine learning system being trained by calculating a cost function from the difference between the features of the first font and the features of the second font, and from the data that represents the similarity between the first and second fonts as determined by one or more individuals.

27. The non-transitory computer readable media of claim 26, wherein training the machine learning system includes minimizing the cost function.

28. The non-transitory computer readable media of claim 25, wherein the data representing similarity between the first and second fonts as determined by one or more individuals includes survey-based data.

29. The non-transitory computer readable media of claim 25, wherein training the machine learning system includes calculating a level of similarity between the first font and the second font from the first font features and the second font features.

30. The non-transitory computer readable media of claim 29, wherein calculating the level of similarity includes determining the difference between features of the first font and corresponding features of the second font.

31. The non-transitory computer readable media of claim 29, wherein training the machine learning system includes comparing the calculated level of similarity between the first and second fonts and a value that represents the similarity between the first and second fonts.

32. The non-transitory computer readable media of claim 25, wherein the machine learning system implements a neural network.

33. The non-transitory computer readable media of claim 25, wherein the pair of fonts used by the machine learning system to determine the level of similarity do not include training fonts.

34. The non-transitory computer readable media of claim 25, wherein the focus font is user selected.

35. The non-transitory computer readable media of claim 25, wherein the presented order of the fonts accounts for a level of similarity between each pair of fonts adjacently positioned on the produced list.

36. The non-transitory computer readable media of claim 25, wherein the features of a first font are produced from one or more bitmap images rendered by the machine learning system.

* * * * *

UNITED STATES PATENT AND TRADEMARK OFFICE
CERTIFICATE OF CORRECTION

PATENT NO. : 9,805,288 B2
APPLICATION NO. : 15/053244
DATED : October 31, 2017
INVENTOR(S) : Sampo Juhani Kaasila et al.

Page 1 of 1

It is certified that error appears in the above-identified patent and that said Letters Patent is hereby corrected as shown below:

Column 30, Line 44, Claim 1, delete "level a" insert -- level of --;

Column 31, Line 41, Claim 13, delete "level a" insert -- level of --;

Column 32, Line 31, Claim 25, delete "level a" insert -- level of --.

Signed and Sealed this
Twenty-second Day of October, 2019

Andrei Iancu
*Director of the United States Patent and Trademark Office*